United States Patent
Amano

(10) Patent No.: US 9,302,597 B2
(45) Date of Patent: Apr. 5, 2016

(54) VEHICLE AND METHOD OF CONTROLLING VEHICLE

(75) Inventor: Takashi Amano, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 14/352,364

(22) PCT Filed: Oct. 26, 2011

(86) PCT No.: PCT/JP2011/074610
§ 371 (c)(1),
(2), (4) Date: Apr. 17, 2014

(87) PCT Pub. No.: WO2013/061413
PCT Pub. Date: May 2, 2013

(65) Prior Publication Data
US 2014/0236411 A1   Aug. 21, 2014

(51) Int. Cl.
*B60L 15/20* (2006.01)
*B60K 6/445* (2007.10)
(Continued)

(52) U.S. Cl.
CPC ............ *B60L 15/2045* (2013.01); *B60K 6/445* (2013.01); *B60K 31/00* (2013.01); *B60L 7/14* (2013.01); *B60L 11/123* (2013.01); *B60L 11/14* (2013.01); *B60L 11/1861* (2013.01); *B60L 15/2009* (2013.01); *B60W 10/06* (2013.01); *B60W 10/08* (2013.01); *B60W 20/00* (2013.01); *B60W 20/108* (2013.01); *B60L 2210/10* (2013.01); *B60L 2210/40* (2013.01); *B60L 2220/14* (2013.01); *B60L 2240/12* (2013.01); *B60L 2240/421* (2013.01); *B60L 2240/423* (2013.01); *B60L 2240/441* (2013.01); *B60L 2240/443* (2013.01); *B60L 2240/547* (2013.01); *B60L 2240/549* (2013.01); *B60W 2030/1809* (2013.01); *B60W 2540/10* (2013.01); *B60W 2710/083* (2013.01); *Y02T 10/6217* (2013.01); *Y02T 10/6239* (2013.01); *Y02T 10/6286* (2013.01); *Y02T 10/642* (2013.01); *Y02T 10/645* (2013.01);
(Continued)

(58) Field of Classification Search
CPC combination set(s) only.
See application file for complete search history.

(56) References Cited

U.S. PATENT DOCUMENTS

2002/0023793 A1*  2/2002  Hattori et al. ............... 180/169
2003/0042054 A1*  3/2003  Matsubara et al. .......... 180/65.2
(Continued)

FOREIGN PATENT DOCUMENTS

EP   2762349 A1   8/2014
JP   S61-287828 A   12/1986
(Continued)

*Primary Examiner* — Bhavesh V Amin
(74) *Attorney, Agent, or Firm* — Oliff PLC

(57) ABSTRACT

A vehicle includes a driving source generating driving power for running the vehicle, and a control device for controlling the driving source. The control device performs driving power variation operation on the driving source in which the driving source is switched between a first state where the driving source generates driving power and a second state where the driving source generates driving power of a level lower than the level of the driving power in the first state to run the vehicle. The control device performs the driving power variation operation during steady running when variation in driving power requested by a user falls within a prescribed range, and also performs the driving power variation operation during an acceleration request or during a deceleration request when the variation in the requested driving power increases or decreases beyond the prescribed range.

8 Claims, 17 Drawing Sheets

(51) Int. Cl.
- *B60W 10/08* (2006.01)
- *B60W 20/00* (2006.01)
- *B60L 11/12* (2006.01)
- *B60L 11/14* (2006.01)
- *B60W 10/06* (2006.01)
- *B60L 7/14* (2006.01)
- *B60L 11/18* (2006.01)
- *B60K 31/00* (2006.01)
- *B60W 30/18* (2012.01)

(52) U.S. Cl.
CPC ............ *Y02T10/705* (2013.01); *Y02T 10/7005* (2013.01); *Y02T 10/7044* (2013.01); *Y02T 10/7077* (2013.01); *Y02T 10/7216* (2013.01); *Y02T 10/7241* (2013.01); *Y02T 10/7283* (2013.01); *Y10S 903/93* (2013.01)

(56) References Cited

U.S. PATENT DOCUMENTS

| | | | |
|---|---|---|---|
| 2004/0097327 A1* | 5/2004 | Loeffler et al. | 477/15 |
| 2005/0130796 A1* | 6/2005 | Loeffler et al. | 477/4 |
| 2005/0255965 A1* | 11/2005 | Tao et al. | 477/4 |
| 2007/0111848 A1* | 5/2007 | Tabata et al. | 477/3 |
| 2008/0051950 A1* | 2/2008 | Seo et al. | 701/22 |
| 2009/0146615 A1* | 6/2009 | Zillmer et al. | 322/23 |
| 2010/0241297 A1 | 9/2010 | Aoki et al. | |

FOREIGN PATENT DOCUMENTS

| | | |
|---|---|---|
| JP | A-2008-520485 | 6/2008 |
| JP | A-2009-298232 | 12/2009 |
| JP | A-2010-6309 | 1/2010 |
| JP | A-2010-93947 | 4/2010 |
| JP | A-2010-178431 | 8/2010 |
| JP | 2012-147611 A | 8/2012 |

* cited by examiner

VEHICLE AND METHOD OF CONTROLLING VEHICLE

TECHNICAL FIELD

The present invention relates to vehicles and methods of controlling the vehicles, and more particularly to running control of a vehicle running with inertial force of the vehicle.

BACKGROUND ART

In recent years, vehicles incorporating a power storage device (such as a secondary battery or capacitor) and running with driving power generated from electric power stored in the power storage device have been receiving attention as environmentally friendly vehicles. Examples of such vehicles include an electric vehicle, a hybrid vehicle, and a fuel cell vehicle.

There is a need to improve energy efficiency of these vehicles by increasing gasoline mileage and electric mileage, so as to further reduce environmental loads.

Japanese National Patent Publication No. 2008-520485 (PTD 1) discloses a hybrid vehicle including an internal combustion engine and a motor generator, in which the motor generator is controlled, when in a generator mode, in such a manner that the motor generator alternates between a first interval and a second interval. During the first interval, the motor generator is driven to operate with a high output which is greater than an actual power consumption of a vehicle electrical system. During the second interval, the motor generator is switched off.

According to Japanese National Patent Publication No. 2008-520485 (PTD 1), when the motor generator operates as a generator, the motor generator is driven at an operating point of high efficiency in the first interval and the motor generator is stopped in the second interval. As a result, continuation of the operation of the motor generator with low efficiency during operation of electric power generation can be suppressed, thus improving energy efficiency of the vehicle during the operation of electric power generation.

Japanese Patent Laying-Open No. 2010-6309 (PTD 2) discloses a hybrid vehicle including an internal combustion engine and a motor generator, which is configured to alternate between running with driving power generated by the internal combustion engine and running in a coasting state in which the internal combustion engine is stopped. As a result, the internal combustion engine can be driven at an operating point of high efficiency, thus increasing gasoline mileage.

CITATION LIST

Patent Documents

PTD 1: Japanese National Patent Publication No. 2008-520485
PTD 2: Japanese Patent Laying-Open No. 2010-6309
PTD 3: Japanese Patent Laying-Open No. 2009-298232
PTD 4: Japanese Patent Laying-Open No. 2010-178431

SUMMARY OF INVENTION

Technical Problem

In the configuration of Japanese National Patent Publication No. 2008-520485 (PTD 1) described above, however, driving and stopping of the motor generator is repeated when the motor generator generates electric power, and the driving power for running the vehicle is not varied.

In the configuration disclosed in Japanese Patent Laying-Open No. 2010-6309 (PTD 2), driving and stopping of an engine which is the internal combustion engine is repeated in the hybrid vehicle.

When driving and stopping of a driving source is repeated as described above, a loss may occur during a transition to (at the start of) a driven state from a stopped state.

The present invention has been made in order to solve such problems, and an object of the present invention is to improve energy efficiency during vehicle running in a vehicle capable of running with driving power from an engine and/or a motor generator.

Solution to Problem

One aspect of the present invention is a vehicle including a driving source generating driving power for running the vehicle, and a control device for controlling the driving source. The control device performs driving power variation operation on the driving source in which the driving source is switched between a first state where the driving source generates driving power and a second state where the driving source generates driving power of a level lower than the level of the driving power in the first state to run the vehicle. The control device performs the driving power variation operation during steady running when variation in driving power requested by a user falls within a prescribed range, and also performs the driving power variation operation during an acceleration request or during a deceleration request when the variation in the requested driving power increases or decreases beyond the prescribed range.

Preferably, the control device switches the driving source to the first state in response to a decrease in a speed of the vehicle to a lower limit value of an acceptable range, and switches the driving source to the second state in response to an increase in the speed of the vehicle to an upper limit value of the acceptable range. The control device sets a width of the acceptable range to be narrower during the acceleration request than during the steady running.

Preferably, the control device sets the upper limit value of the acceptable range based on the driving power requested by the user, and brings the lower limit value of the acceptable range closer to the upper limit value during the acceleration request than during the steady running.

More preferably, the control device sets the lower limit value of the acceptable range based on the driving power requested by the user, and brings the upper limit value of the acceptable range closer to the lower limit value during the acceleration request than during the steady running.

Preferably, the control device causes switching to the first state in response to a decrease in the speed of the vehicle to a lower limit value of an acceptable range, and causes switching to the second state in response to an increase in the speed of the vehicle to an upper limit value of the acceptable range. The control device sets a width of the acceptable range to be narrower during the deceleration request than during the steady running.

More preferably, the control device sets the upper limit value of the acceptable range based on the driving power requested by the user, and brings the lower limit value of the acceptable range closer to the upper limit value during the deceleration request than during the steady running.

More preferably, the control device sets the lower limit value of the acceptable range based on the driving power requested by the user, and brings the upper limit value of the acceptable range closer to the lower limit value during the deceleration request than during the steady running.

Preferably, the driving source includes a rotating electric machine and an internal combustion engine. The control device switches both of the rotating electric machine and the internal combustion engine between the first state and the second state to run the vehicle in the driving power variation operation. During the acceleration request, the control device accelerates the vehicle by raising the level of the driving power of the internal combustion engine in the first state while maintaining the level of the driving power of the rotating electric machine in the first state constant.

Preferably, the driving source includes a rotating electric machine and an internal combustion engine. The control device switches both of the rotating electric machine and the internal combustion engine between the first state and the second state to run the vehicle in the driving power variation operation. During the deceleration request, the control device accelerates the vehicle by lowering the level of the driving power of the rotating electric machine in the first state while maintaining the level of the driving power of the internal combustion engine in the first state constant.

Another aspect of the present invention is a method of controlling a vehicle, the vehicle including a driving source generating driving power for running the vehicle, and a control device for controlling the driving source. The control method includes the steps of performing driving power variation operation on the driving source in which the driving source is switched between a first state where the driving source generates driving power and a second state where the driving source generates driving power of a level lower than the level of the driving power in the first state to run the vehicle during steady running when variation in driving power requested by a user falls within a prescribed range, and performing the driving power variation operation during an acceleration request or a deceleration request when the variation in the requested driving power increases or decreases beyond the prescribed range.

Advantageous Effects of Invention

According to the present invention, energy efficiency during vehicle running including a time during acceleration and deceleration can be improved in a vehicle capable of running with driving power from an engine and/or a motor generator.

DESCRIPTION OF EMBODIMENTS

Figure 1:
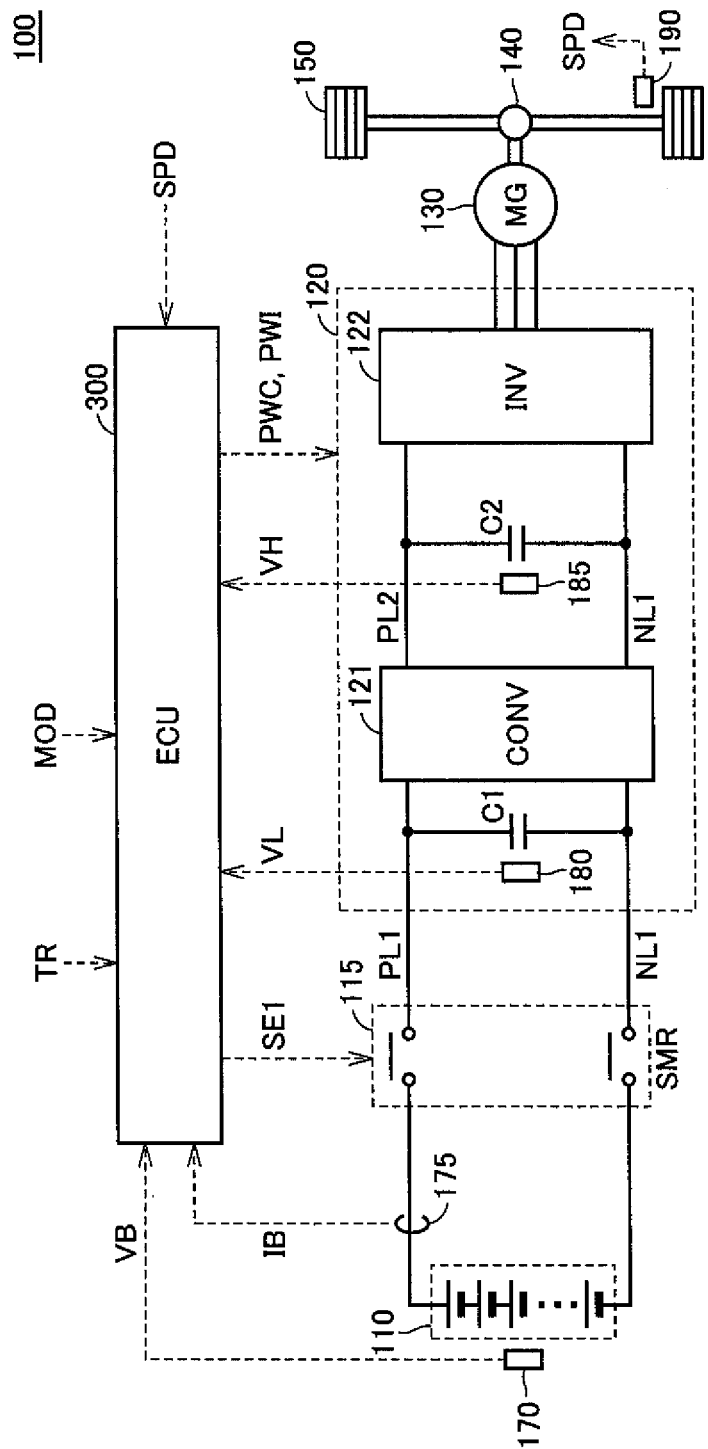
FIG. 1 is an overall block diagram of a vehicle 100 according to a first embodiment of the present invention.

Embodiments of the present invention will be hereinafter described in detail with reference to the drawings, in which the same or corresponding elements are designated by the same reference characters, and the description thereof will not be repeated.

First Embodiment

FIG. 1 is an overall block diagram of a vehicle 100 according to a first embodiment of the present invention. As will be described below in detail, vehicle 100 is an electric vehicle including a rotating electric machine as a driving source.

Referring to FIG. 1, vehicle 100 includes a power storage device 110, a system main relay (SMR) 115, a PCU (Power Control Unit) 120 which is a driving device, a motor generator 130, a power transmission gear 140, a drive wheel 150, and an ECU (Electronic Control Unit) 300 which is a control device. PCU 120 includes a converter 121, an inverter 122, voltage sensors 180, 185, and capacitors C1, C2.

Power storage device 110 is an electric power storage component configured in a chargeable/dischargeable manner. Power storage device 110 includes a secondary battery such as a lithium-ion battery, a nickel-metal hydride battery or a lead-acid battery, or a power storage element such as an electric double layer capacitor.

Power storage device 110 is connected to PCU 120 through power lines PL1 and NL1. Power storage device 110 supplies PCU 120 with electric power for generating driving power for vehicle 100. Power storage device 110 stores electric power generated by motor generator 130. An output of power storage device 100 is, for example, about 200 V.

Power storage device 110 is provided with a voltage sensor 170 and a current sensor 175. Voltage sensor 170 detects a voltage VB of power storage device 110, and outputs a result of the detection to ECU 300. Current sensor 175 detects a current IB input to and output from the power storage device, and outputs the detection value to ECU 300.

SMR 115 includes a relay having one end connected to a positive electrode terminal of power storage device 110 and the other end connected to power line PL1 that is connected to PCU 120, and another relay having one end connected to a negative electrode terminal of power storage device 110 and the other end connected to power line NL1 that is connected to PCU 120. In response to a control signal SE1 from ECU 300, SMR 115 switches between supply and interruption of electric power between power storage device 110 and PCU 120.

In response to a control signal PWC from ECU 300, converter 121 converts a voltage between power lines PL1, NL1 and power lines PL2, NL1. Power line NL1 on the side of SMR 115 and power line NL1 on the side of inverter 122 are electrically connected together inside converter 121, and are designated by the same character.

Inverter 122 is connected to power lines PL2 and NL1. In response to a control signal PWI from ECU 300, inverter 122 converts DC power supplied from converter 121 to AC power, to drive motor generator 130.

Capacitor C1 is provided between power lines PL1 and NL1, and reduces voltage variation between power lines PL1 and NL1. Capacitor C2 is provided between power lines PL2 and NL1, and reduces voltage variation between power lines PL2 and NL1.

Voltage sensors 180 and 185 detect voltages VL and VH across capacitors C1 and C2, respectively, and output the detection values to ECU 300.

Motor generator 130 is an AC rotating electric machine, for example, a permanent magnet synchronous motor including a rotor in which a permanent magnet is embedded.

An output torque of motor generator 130 is transmitted to drive wheel 150 through power transmission gear 140 including a reduction gear and a power split device, to run vehicle 100. During regenerative braking operation of vehicle 100, motor generator 130 can generate electric power by rotation of drive wheel 150. The electric power thus generated is then converted by PCU 120 to charging power for power storage device 110.

A speed sensor 190 is provided in the vicinity of drive wheel 150 so as to detect the speed of vehicle 100 (vehicle speed). Speed sensor 190 detects a vehicle speed SPD based on a rotational speed of drive wheel 150, and outputs the detection value to ECU 300. As a speed sensor, a rotation angle sensor (not shown) for detecting a rotation angle of motor generator 130 may be used. In this case, ECU 300 indirectly computes vehicle speed SPD based on temporal variation in rotation angle of motor generator 130, a reduction ratio and the like.

Although not shown in FIG. 1, ECU 300 includes a CPU (Central Processing Unit), a storage device and an input/output buffer, causes input of signals from various sensors and the like and output of control signals to various devices, and controls power storage device 110 and the various devices of vehicle 100. Such control is not limited to software processing, but may be processed by dedicated hardware (electronic circuitry).

ECU 300 generates and outputs control signals for controlling PCU 120, SMR 115 and the like. Although FIG. 1 shows a configuration where one control device is provided as ECU 300, a separate control device may be provided for each function or for each device to be controlled, such as a control device for PCU 120 and a control device for power storage device 110.

ECU 300 computes an SOC (State of Charge) of power storage device 110 based on the detection values of voltage VB and current IB from voltage sensor 170 and current sensor 175 provided on power storage device 110.

ECU 300 receives a request torque TR, which is determined based on operation of an accelerator pedal (not shown) by a user, from an upper ECU (not shown). ECU 300 generates controls signals PWC and PWI for converter 121 and inverter 122 based on request torque TR from the user, respectively, to drive motor generator 130.

ECU 300 also receives a mode signal MOD which is set by the user. This mode signal MOD is a signal for indicating whether or not inertial running control which will be described later should be performed. Mode signal MOD is switched by a specific switch, setting on an operation screen or the like. Alternatively, mode signal MOD may be automatically set when specific conditions are satisfied.

For example, ECU 300 operates such that the inertial running control is performed when mode signal MOD is set to ON, and operates such that the inertial running control is not performed but normal running is performed when mode signal MOD is set to OFF.

In such a vehicle, the electric power in the power storage device is consumed when driving power is generated by motor generator 130. Since power storage device 110 has a predetermined capacity, there is a need to improve energy efficiency during running to suppress power consumption in order for the vehicle to run the longest distance possible with the electric power stored in the power storage device.

Inertial force acts on a vehicle during vehicle running. Thus, if driving power generated by a motor generator is made lower during running than driving power required to maintain the vehicle speed, running with the inertial force of the vehicle (hereinafter also referred to as "inertial running") is continued for some time while the vehicle speed gradually decreases.

During this inertial running, the driving power output from the motor generator is small, thus reducing power consumption by the power storage device. Accordingly, if the vehicle can run utilizing the inertial running, the energy efficiency during the vehicle running can be improved.

In the first embodiment, therefore, in the electric vehicle shown in FIG. 1, the inertial running control is performed in which operation of repeating a high output state of the driving power from the motor generator and a low output state of the driving power from the motor generator (hereinafter also referred to as "driving power variation operation") is performed to run the vehicle, thereby improving the energy efficiency during running.

Figure 2:
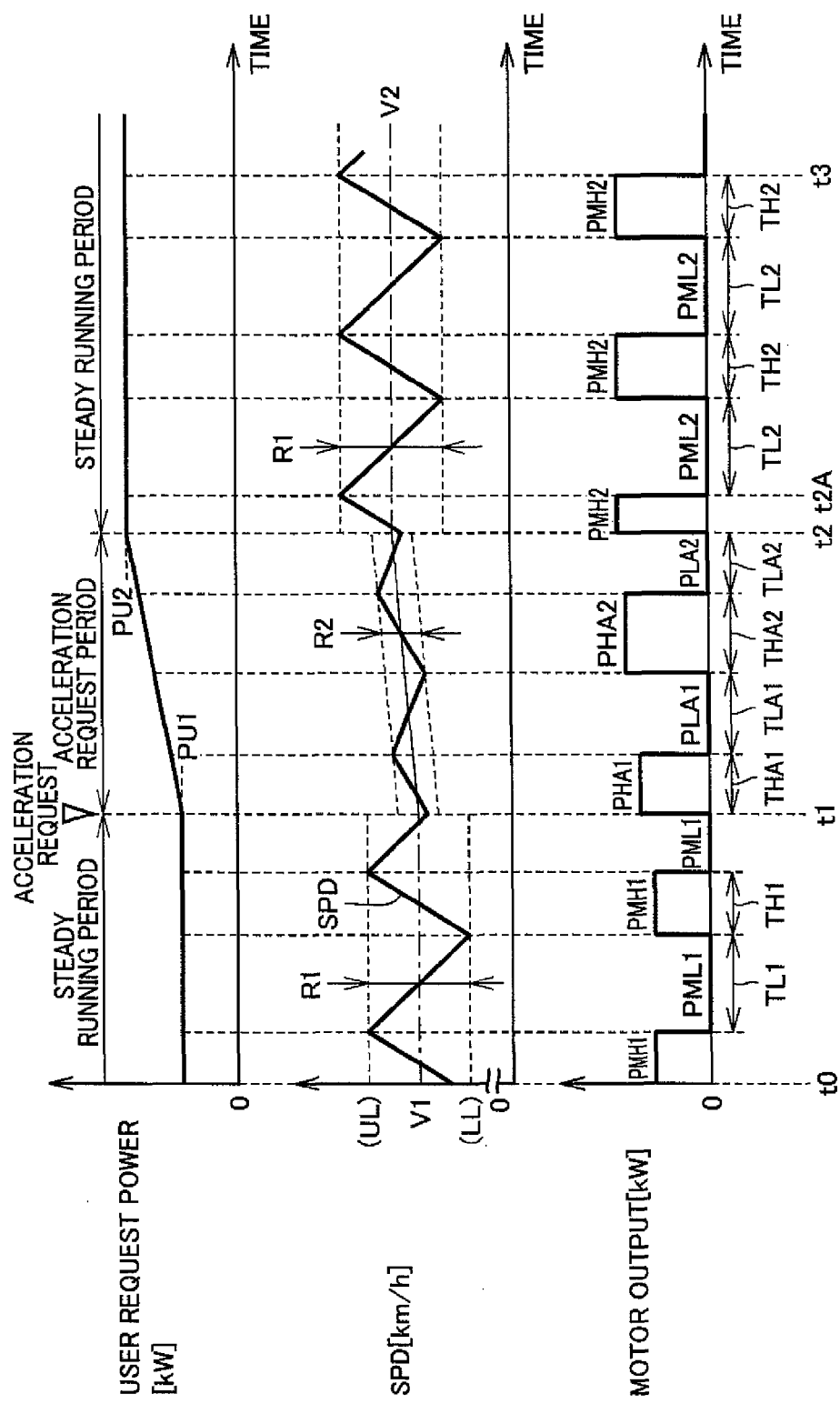
FIG. 2 is a first time chart (during acceleration) illustrating the outline of inertial running control in the first embodiment.

FIG. 2 is a first time chart (during acceleration) illustrating the outline of inertial running control in the first embodiment. In FIG. 2, a horizontal axis represents time, and a vertical axis represents power requested by the user, vehicle speed SPD, and the output of the motor generator.

Referring to FIGS. 1 and 2, it is assumed, for example, that vehicle 100 runs on a flat road at a constant vehicle speed V1. In this case, power requested by the user is given as a substantially constant value PU1, as shown in FIG. 2. That "power requested by the user is a substantially constant value" refers to a state in which the user request power is maintained, although it varies to a degree, within a predetermined range (e.g., ±3 km/h) during a prescribed period of time.

When the inertial running control in the first embodiment is not applied, an output of substantially constant magnitude is continuously provided from motor generator 130. As such, vehicle speed SPD is maintained substantially constant at vehicle speed V1 in FIG. 2.

In contrast, when the inertial running control in the first embodiment is applied, acceleration running in which the driving power from motor generator 130 is in a high output state and inertial running in which the driving power from motor generator 130 is in a low output state are alternately repeated.

Specifically, during a steady running period between times t0 and t1, a first state in which motor driving power PMH1 is output for a period TH1 and a second state in which motor driving power PML1 continues to be output for a period TL1 are alternately repeated.

In the second state in which motor driving power PML1 continues to be output for period TL1 during the inertial running control, motor driving power PML1 is smaller than driving power capable of maintaining current vehicle speed V1, and therefore running with the inertial force is started and vehicle speed SPD gradually decreases, as indicated by a solid line in FIG. 2.

During this time, the charge and discharge power of power storage device 110 decreases, thus suppressing a decrease in SOC as compared to an example where a constant output is provided.

Then, when vehicle speed SPD decreases to a lower limit value LL of a predetermined acceptable range R1 with respect to target vehicle speed V1, motor generator 130 is switched to be driven in a high output state. At this time, the motor output is set to PMH1 larger than an output required to maintain vehicle speed V1. Vehicle 100 is thus accelerated. During this acceleration running, a decrease in SOC is slightly larger than when the inertial running control is not performed. Nevertheless, because power consumption is suppressed by the inertial running at motor driving power PML1, the total SOC is maintained at a high level as compared to the example where a constant output is provided.

Then, when vehicle speed SPD increases to an upper limit value UL of predetermined acceptable range R1, motor generator 130 is switched to a low output state (driving power PML1) again and inertial running is performed. The output may be zero (PML1=0) in the low output state.

By repeating such driving power variation operation, a decrease in SOC of the power storage device can be suppressed while an average speed of vehicle speed SPD is maintained substantially at V1, although vehicle speed SPD varies within acceptable range R1. As a result, the energy efficiency can be improved as a whole, thereby increasing the distance that can be traveled with the electric power stored in the power storage device.

It is to be noted that the motor output and acceleration time when the motor generator performs acceleration running can be set appropriately. For example, the acceleration time may be set to a prescribed period of time, and the motor output may be set such that vehicle speed SPD can be increased from lower limit value LL to upper limit value UL during that period. Alternatively, the motor output used for acceleration may be set to a prescribed output, and the acceleration time may be set depending on the situation. If the acceleration time is too short, large power is needed, which may cause torque shock. If the motor output is too small, on the other hand, the acceleration time, namely, driving time of the motor generator is increased, making it difficult to perform inertial running. Therefore, the acceleration time and the motor output during acceleration are set appropriately in consideration of drivability and energy efficiency.

Then, an acceleration request is made by the user at time t1. During an acceleration request period between times t1 and t2, the user request power gradually increases from PU1 to PU2. During this time, the average speed of the vehicle increases from speed V1 to a speed V2. Motor driving powers PHA1 and PHA2 gradually increase so as to increase the average speed. Motor driving powers PLA1 and PLA2 are also determined appropriately so as to increase the average speed. Motor driving powers PLA1 and PLA2 may be zero. Periods THA1 and THA2 of motor driving powers PHA1 and PHA2 and periods TLA1 and TLA2 of motor driving powers PLA1 and PLA2 are also determined appropriately so as to increase the average speed.

A width of an acceptable speed range R2 between times t1 and t2 is set to be narrower than a width of acceptable speed range R1 between times t0 and t1. The drivability is thus improved, such as by eliminating non-smoothness during acceleration.

A period between times t2 and t3 is a steady running period when the user request power becomes constant again at PU2 (>PU1). During this period, speed recovery at motor driving power PMH2 and running with the inertial force at motor driving power PML2 are repeated.

At time t2 in FIG. 2, vehicle speed SPD is lower than speed V2 which is determined based on the user request power. Thus, motor power PMH2 is output immediately, and a transition to inertial running is made at time t2A when vehicle seed SPD reaches upper limit vehicle speed UL.

As shown in FIG. 2, in the vehicle of the first embodiment, during the inertial running control, width R2 of the acceptable speed range for the acceleration request period is set to be narrower than width R1 of the acceptable speed range for the steady running period. Widths R1 and R2 are set with the average speed as a center.

With such control, the energy efficiency during the vehicle running is improved during the steady running period, and deterioration in drivability during acceleration is suppressed while the energy efficiency is improved during the acceleration request period.

Figure 3:
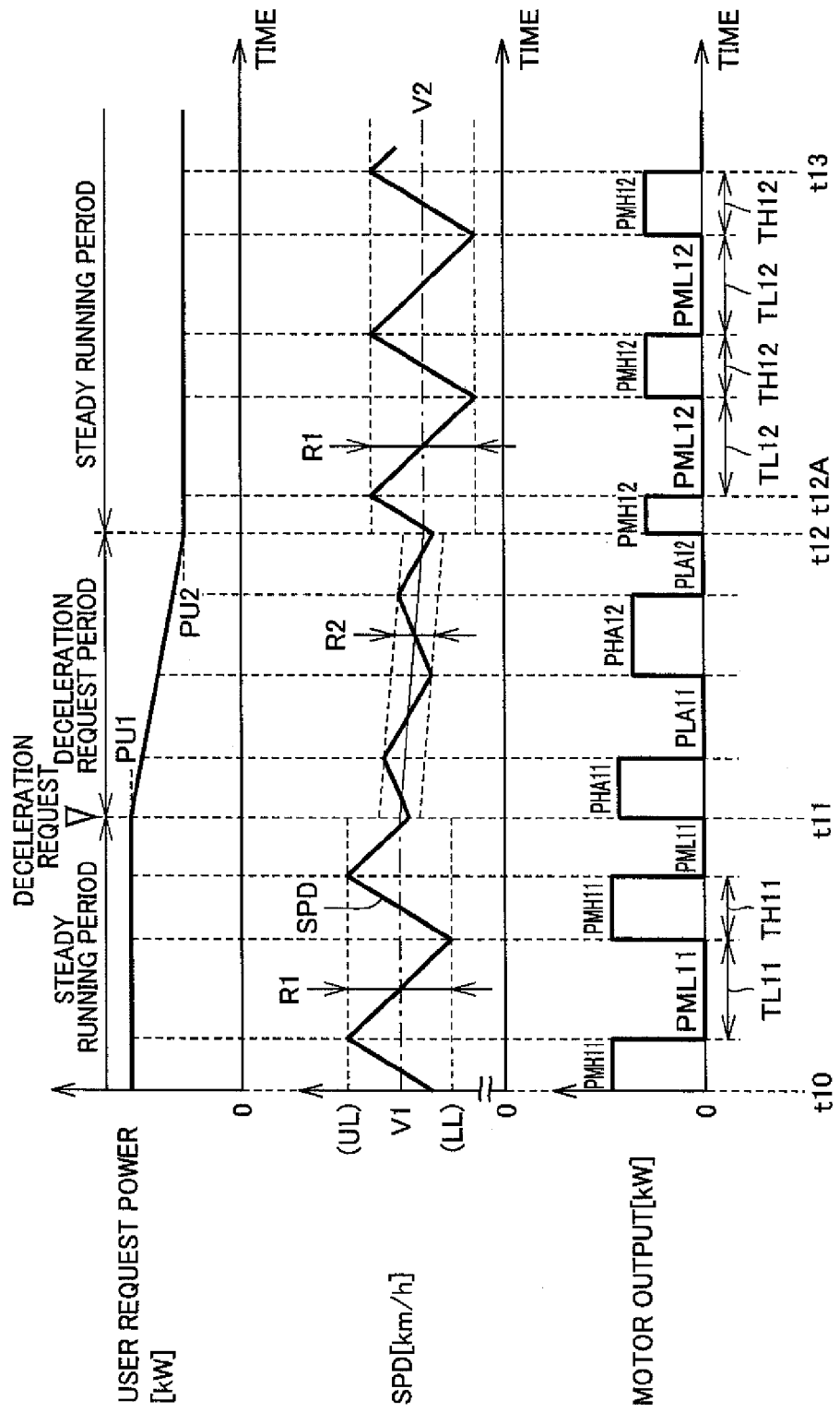
FIG. 3 is a second time chart (during deceleration) illustrating the outline of inertial running control in the first embodiment.

FIG. 3 is a second time chart (during deceleration) illustrating the outline of inertial running control in the first embodiment. In FIG. 3, a horizontal axis represents time, and a vertical axis represents power requested by the user, vehicle speed SPD, and the output of the motor generator.

Referring to FIGS. 1 and 3, between times t10 and t11, the inertial running control is applied, so that acceleration running in which the driving power of motor generator 130 is in a high output state and inertial running in which the driving power of motor generator 130 is in a low output state are alternately repeated.

Specifically, during a steady running period between times t10 and t11, a first state in which motor driving power PMH11 is output for a period TH11 and a second state in which motor driving power PML11 continues to be output for a period TL11 are alternately repeated.

In the second state in which motor driving power PML11 continues to be output for period TL11 during the inertial running control, motor driving power PML11 is smaller than driving power capable of maintaining current vehicle speed V1, and therefore running with the inertial force is started and vehicle speed SPD gradually decreases, as indicated by a solid line in FIG. 3.

During this time, the charge and discharge power of power storage device 110 decreases, thus suppressing a decrease in SOC as compared to an example where a constant output is provided.

Then, when vehicle speed SPD decreases to lower limit value LL of predetermined acceptable range R1 with respect to target vehicle speed V1, motor generator 130 is switched to be driven in a high output state. At this time, the motor output is set to PMH11 larger than the output required to maintain vehicle speed V1. Vehicle 100 is thus accelerated. During this acceleration running, a decrease in SOC is slightly larger than when the inertial running control is not performed. Nevertheless, because power consumption is suppressed by the inertial running at motor driving power PML11, the total SOC is maintained at a high level as compared to the example where a constant output is provided.

Then, when vehicle speed SPD increases to upper limit value UL of predetermined acceptable range R1, motor generator 130 is switched to a low output state (driving power PML1) again and inertial running is performed. The output may be zero (PML1=0) in the low output state.

By repeating such driving power variation operation, a decrease in SOC of the power storage device can be suppressed while an average speed of vehicle speed SPD is maintained substantially at V1, although vehicle speed SPD varies within acceptable range R1. As a result, the energy efficiency can be improved as a whole, thereby increasing the distance that can be traveled with the electric power stored in the power storage device.

The acceleration time and the motor output during acceleration are set appropriately in consideration of drivability and energy efficiency, as in the period between times t1 and t2 in FIG. 2.

Then, a deceleration request is made by the user at time t11. During a deceleration request period between times t11 and t12, the user request power gradually decreases from PU1 to PU2. During this time, the average speed of the vehicle decreases from speed V1 to speed V2. Motor driving powers PHA11 and PHA12 gradually decrease so as to reduce the average speed. Motor driving powers PLA11 and PLA12 are also determined appropriately so as to reduce the average speed. Motor driving powers PLA11 and PLA12 may be zero. Periods THA11 and THA12 of motor driving powers PHA11 and PHA12 and periods TLA11 and TLA12 of motor driving powers PLA11 and PLA12 are also determined appropriately so as to reduce the average speed.

A width of acceptable speed range R2 between times t11 and t12 is set to be narrower than a width of acceptable speed range R1 between times t0 and t1. The drivability is thus improved, such as by decelerating the vehicle quickly.

A period between times t12 and t13 is a steady running period when the user request power becomes constant again at PU2 (<PU1). During this period, speed recovery at motor driving power PMH12 and running with the inertial force at motor driving power PML12 are repeated.

At time t12 in FIG. 3, vehicle speed SPD is lower than speed V2 which is determined based on the user request power. Thus, motor power PMH12 is output immediately, and a transition to inertial running is made at time t12A when vehicle speed SPD reaches upper limit vehicle speed UL.

As shown in FIG. 3, in the vehicle of the first embodiment, during the inertial running control, width R2 of the acceptable speed range for the deceleration request period is set to be narrower than width R1 of the acceptable speed range for the steady running period. Widths R1 and R2 are set with the average speed as a center.

With such control, the energy efficiency during the vehicle running is improved during the steady running period, and deterioration in drivability during deceleration is suppressed while the energy efficiency is improved during the deceleration request period.

Figure 4:
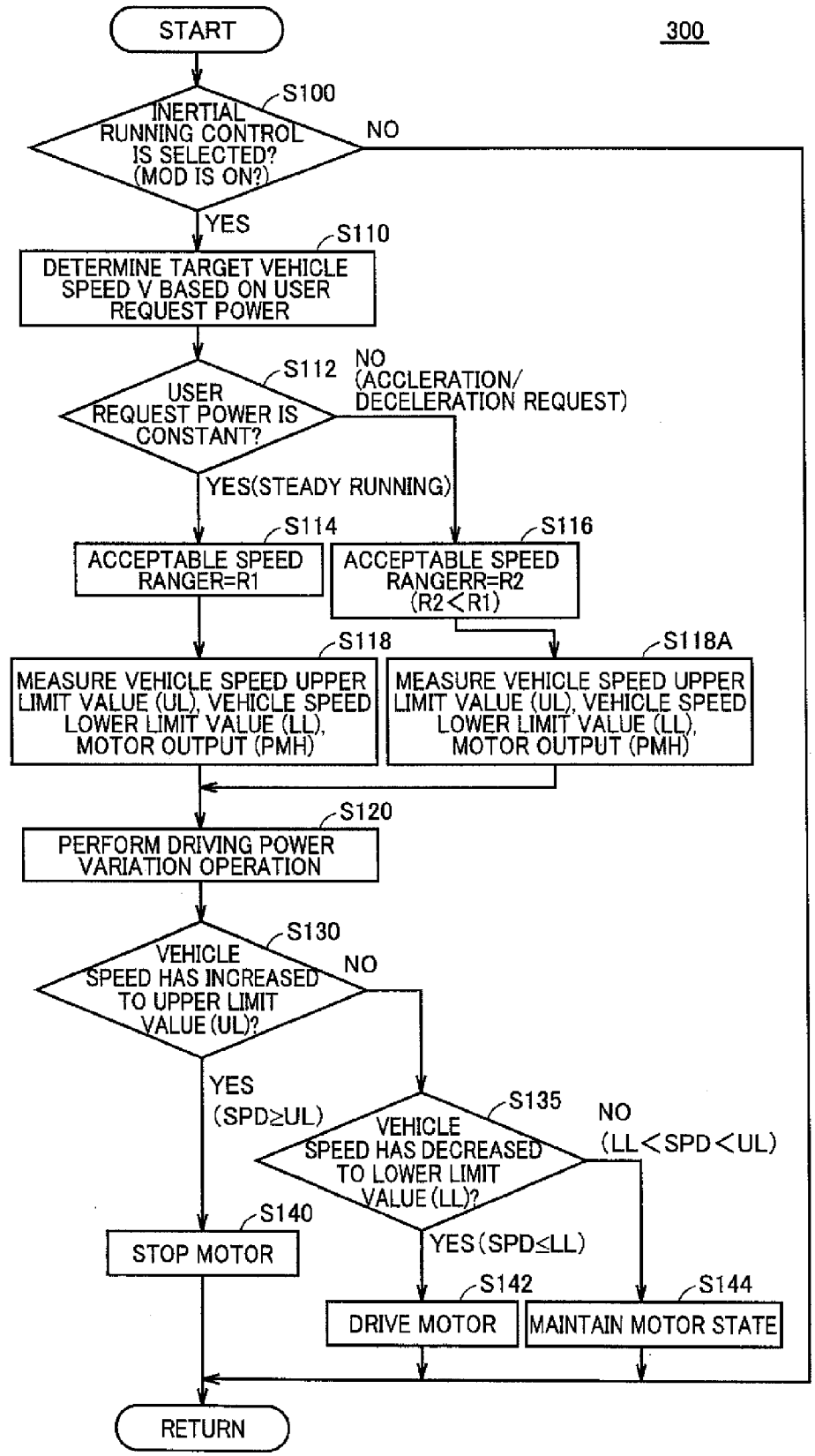
FIG. 4 is a flow chart illustrating a process of the inertial running control performed by an ECU 300 in the first embodiment.

FIG. 4 is a flow chart illustrating a process of the inertial running control performed by ECU 300 in the first embodiment. The steps in the flow charts shown in FIG. 4 and FIGS. 5, 8, 11, 15 and 16 described later are implemented by executing a program stored in advance in ECU 300 at regular intervals. Alternatively, a process of some of the steps may be implemented by building dedicated hardware (electronic circuitry).

Referring to FIGS. 1 and 4, in step (the step is hereinafter abbreviated as S) 100, ECU 300 determines whether or not the inertial running control has been selected based on mode signal MOD which is set by the user.

If mode signal MOD has been set to OFF and the inertial running control has not been selected (NO in S100), the subsequent process is skipped and ECU 300 returns the process to a main routine.

If mode signal MOD has been set to ON and the inertial running control has been selected (YES in S100), the process proceeds to S110.

In S110, ECU 300 determines a target vehicle speed V based on the user request power which is specified by request torque TR. Then, in S112, ECU 300 determines whether or not the user request power is substantially constant based on request torque TR.

If the user request power is substantially constant (YES in S112), the process proceeds to S114 where ECU 300 sets an acceptable range R for the driving power variation operation to range R1 corresponding to the steady running period. If the user request power is not constant (NO in S112), on the other hand, the process proceeds to S116 where ECU 300 sets acceptable range R for the driving power variation operation to range R2 corresponding to the acceleration request period or deceleration request period. The widths of the ranges satisfy R2<R1.

Following the process of S114 or S116, in S118 or S118A, ECU 300 sets vehicle speed upper limit value UL, vehicle speed lower limit value LL and a motor output PMH based on target vehicle speed V and acceptable range R. Then, in the process of step S120 and its subsequent steps, the driving power variation operation is performed in accordance with thus set vehicle speed upper limit value UL, vehicle speed lower limit value LL and motor output PMH for a high output period. If a motor output PML for a low output period is not fixed to zero, motor output PML for a low output period may be changed appropriately.

Then, in S130, ECU 300 determines whether or not vehicle speed SPD has increased to upper limit value UL of the acceptable speed range.

For example, if motor generator 130 is to be initially set in a low output state immediately after the start of the driving power variation operation when vehicle speed SPD is lower than upper limit value UL, vehicle speed SPD gradually decreases.

That is, since vehicle speed SPD has not increased to upper limit value UL of the acceptable speed range (NO in S130), the process proceeds to S135 where ECU 300 determines whether or not vehicle speed SPD has decreased to lower limit value LL of the acceptable speed range.

When vehicle speed SPD is decreasing within the acceptable speed range (LL<SPD<UL), namely, if vehicle speed SPD has not decreased to lower limit value LL of the acceptable speed range (NO in S135), the process proceeds to S144 where ECU 300 maintains a current state of motor generator 130, to continue the inertial running. The process then returns to the main routine, and the process is performed again from S100 in the next control cycle.

When vehicle speed SPD decreases to lower limit value LL of the acceptable speed range while the inertial running is continued (SPD≤LL) (YES in S135), the process proceeds to S142 where ECU 300 switches motor generator 130 to a high output state to perform acceleration running. Vehicle speed SPD is thus increased.

While the vehicle speed is increasing within the acceptable speed range by this acceleration running, NO is selected in S130 and S135. Then, in S144, ECU 300 continues the acceleration running until vehicle speed SPD reaches upper limit value UL of the acceptable speed range.

Then, when vehicle speed SPD increases to upper limit value UL of the acceptable speed range (YES in S130), the process proceeds to S140 where ECU 300 switches motor generator 130 to a low output state to perform inertial running.

In this manner, the driving power variation operation as described above is performed so as to maintain vehicle speed SPD within the acceptable speed range which is set and updated in S118.

Figure 5:
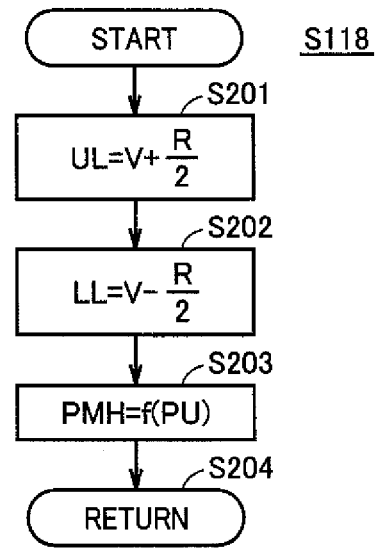
FIG. 5 is a flow chart illustrating the details of a process of setting a vehicle speed upper limit value and a vehicle speed lower limit value, which is performed in S118A in FIG. 4 in the first embodiment.

FIG. 5 is a flow chart illustrating the details of the process of setting the vehicle speed upper limit value and the vehicle speed lower limit value, which is performed in S118 in FIG. 4 in the first embodiment. In the first embodiment, the process shown in the flow chart of FIG. 5 is performed also in S118A in FIG. 4, Referring to FIG. 5, first, in S201, vehicle speed upper limit value UL is set based on target vehicle speed V which was determined in S110 and width R of the acceptable range which was determined in S114 or S116, in accordance with the following equation (1):

$$UL = V + R/2 \tag{1}$$

Then, in S202, vehicle speed lower limit value LL is set based on target vehicle speed V which was determined in S110 and width R of the acceptable range which was determined in S114 or S116, in accordance with the following equation (2):

$$LL = V - R/2 \tag{2}$$

Furthermore, in S203, PMH indicating a pulse height of the motor output during the high output period is determined based on user request power PU and a predetermined function f (PU). Function f (PU) may be an experimentally obtained map or the like.

Then, in S204, the control is returned to the flow chart of FIG. 4, and the process of step S120 and its subsequent steps is performed.

By performing the control in accordance with the process as described above, the driving power variation operation of repeating inertial running and acceleration running can be performed not only when the user request power is substantially constant (steady running period) but also during the acceleration request period and the deceleration request period, to thereby improve the energy efficiency during the vehicle running. Furthermore, since the acceptable speed range during the acceleration request period and the deceleration request period is set to be narrower than the range during the steady running period, the drivability during acceleration and deceleration can be improved.

Second Embodiment

In the first embodiment, when setting the width of the acceptable speed range to be narrow during the acceleration request period or the deceleration request period, vehicle speed upper limit value UL and vehicle speed lower limit value LL are set with the average vehicle speed as a center during speed variation. In contrast, in a second embodiment, the width of the acceptable speed range is similarly set to be narrow during the acceleration request period or the deceleration request period. In so doing, control is performed such that the average speed is higher than that in the first embodiment by limiting the vehicle speed lower limit value further than the upper limit value.

Figure 6:
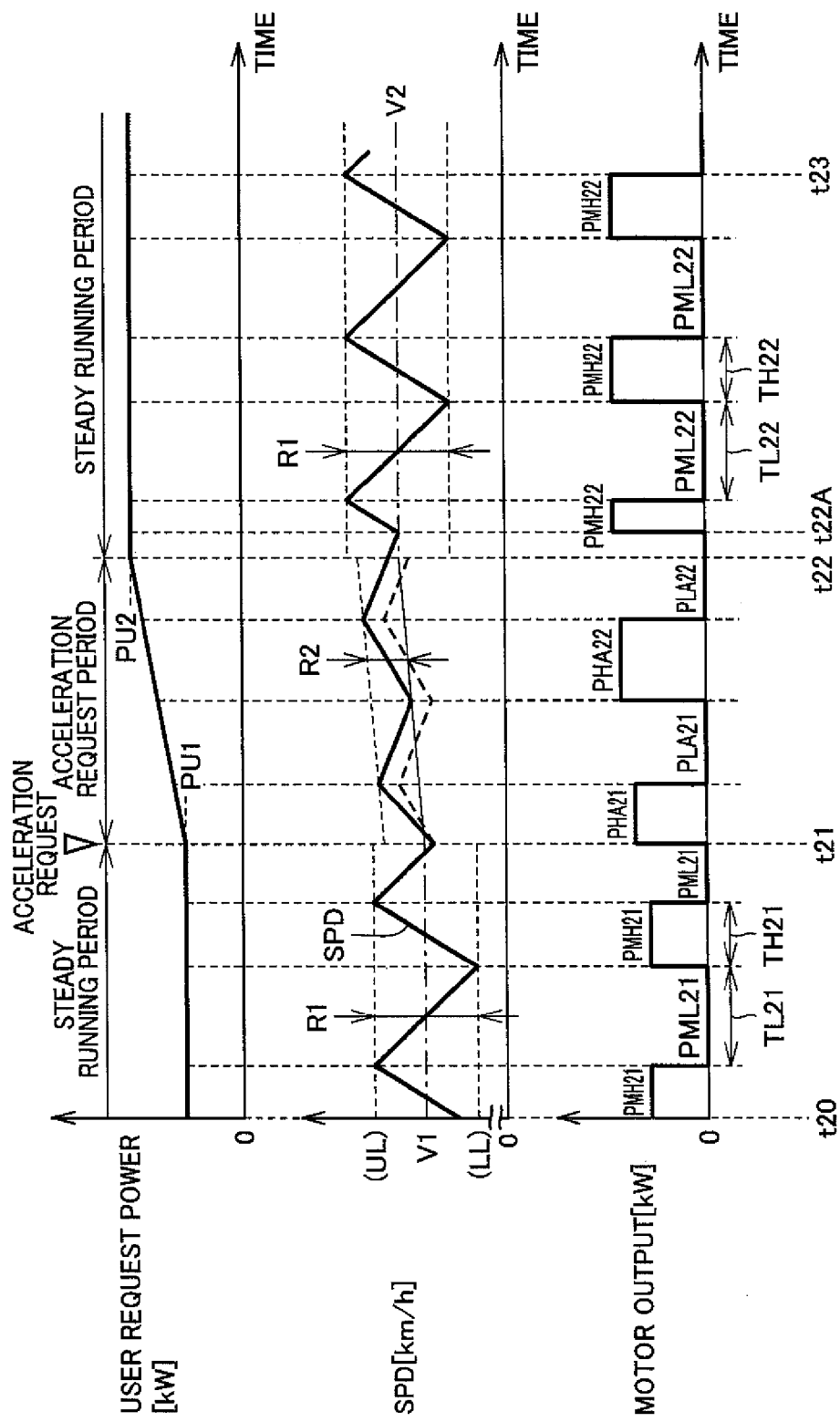
FIG. 6 is a first time chart (during acceleration) illustrating the outline of inertial running control in a second embodiment.

FIG. 6 is a first time chart (during acceleration) illustrating the outline of inertial running control in the second embodiment. In FIG. 6, a horizontal axis represents time, and a vertical axis represents power requested by the user, vehicle speed SPD, and the output of the motor generator.

During steady running periods between times t20 and t21 and between times t22 and t23 in FIG. 6, control similar to the control during the steady running periods between times t0 and t1 and between times t2 and t3 in FIG. 2 is performed, respectively, and thus the detailed description thereof will not be repeated. Periods TL21, TH21, TL22 and TH22 in FIG. 6 correspond to periods TL1, TH1, TL2 and TH2 in FIG. 2, respectively. Driving powers PMH21, PML21, PMH22 and PML22 in FIG. 6 correspond to PMH1, PML1, PMH2 and PML2 in FIG. 2, respectively.

An acceleration request is made by the user at time t21 in FIG. 6. During an acceleration request period between times t21 and t22, the user request power gradually increases from PU1 to PU2. During this time, the average speed of the vehicle increases from speed V1 to speed V2. Motor driving powers PHA21 and PHA22 gradually increase so as to increase the average speed. Motor driving powers PLA21 and PLA22 are also determined appropriately so as to increase the average speed. Motor driving powers PLA21 and PLA22 may be zero. Periods THA21 and THA22 of motor driving powers PHA21 and PHA22 and periods TLA21 and TLA22 of motor driving powers PLA21 and PLA22 are also determined appropriately so as to increase the average speed.

A width of acceptable speed range R2 between times t21 and t22 is set to be narrower than a width of acceptable speed range R1 between times t20 and t21. The drivability is thus improved, such as by eliminating non-smoothness during acceleration.

Moreover, in FIG. 6, acceptable speed range R2 is shifted toward a higher vehicle speed as compared to FIG. 2. For reference, a waveform of vehicle speed SPD between times t1 and t2 in FIG. 2 is also indicated with a broken line between times t21 and t22 in FIG. 6. Such an upward shift of acceptable speed range R2 shortens the acceleration time (between t21 and t22), and is thus preferable for a vehicle which places importance on response and seeks to attain strong acceleration.

A period between times t22 and t23 is a steady running period when the user request power becomes constant again at PU2 (>PU1). During this period, speed recovery at motor driving power PMH22 and running with the inertial force at motor driving power PML22 are repeated.

Figure 7:
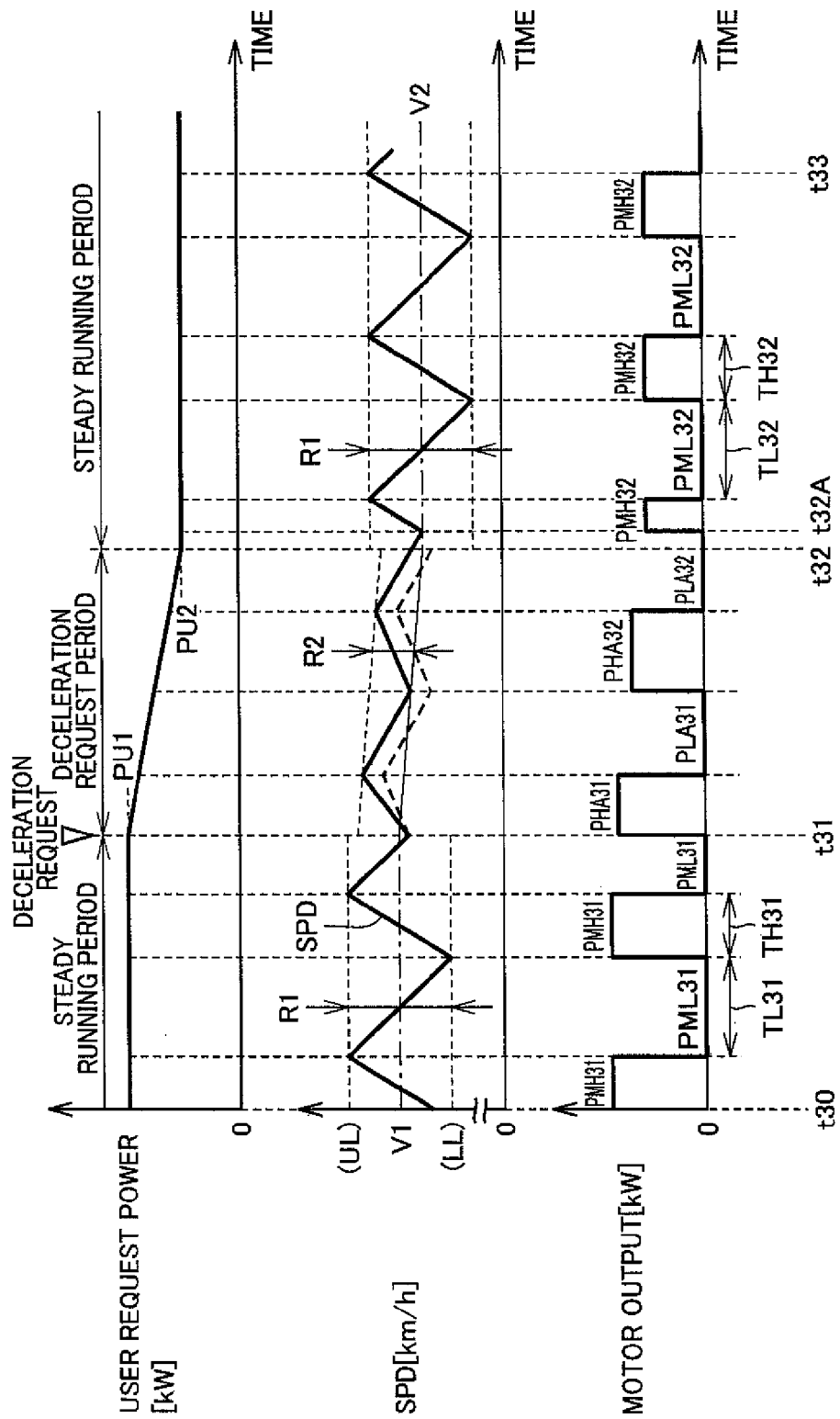
FIG. 7 is a second time chart (during deceleration) illustrating the outline of inertial running control in the second embodiment.

FIG. 7 is a second time chart (during deceleration) illustrating the outline of inertial running control in the second embodiment. In FIG. 7, a horizontal axis represents time, and a vertical axis represents power requested by the user, vehicle speed SPD, and the output of the motor generator.

During steady running periods between times t30 and t31 and between times t32 and t33 in FIG. 7, control similar to the control during the steady running periods between times 110 and t11 and between times t12 and t13 in FIG. 3 is performed, respectively, and thus the detailed description thereof will not be repeated. Periods TL31, TH31, TL32 and TH32 in FIG. 7 correspond to periods TL11, TH11, TL12 and TH12 in FIG. 3, respectively. Driving powers PMH31, PML31, PMH32 and PML32 in FIG. 7 correspond to PMH11, PML11, PMH12 and PML12 in FIG. 3, respectively.

A deceleration request is made by the user at time t31 in FIG. 7. During a deceleration request period between times t31 and t32, the user request power gradually decreases from PU1 to PU2. During this time, the average speed of the vehicle decreases from speed V1 to speed V2. Motor driving powers PHA31 and PHA32 gradually decrease so as to reduce the average speed. Motor driving powers PLA31 and PLA32 are also determined appropriately so as to reduce the average speed. Motor driving powers PLA31 and PLA32 may be zero. Periods THA31 and THA32 of motor driving powers PHA31 and PHA32 and periods TLA31 and TLA32 of motor driving powers PLA31 and PLA32 are also determined appropriately so as to reduce the average speed.

A width of acceptable speed range R2 between times t31 and t32 is set to be narrower than a width of acceptable speed range R1 between times t30 and t31. The drivability is thus improved, such as by decelerating the vehicle quickly.

Moreover, in FIG. 7, acceptable speed range R2 is shifted toward a higher vehicle speed as compared to FIG. 3. For reference, a waveform of vehicle speed SPD between times t11 and t12 in FIG. 3 is also indicated with a broken line between times t31 and t32 in FIG. 7. Such an upward shift of acceptable speed range R2 leads to gradual response during deceleration. In other words, the degree to which the speed is maintained is increased. This is preferable since a sudden speed change can be eliminated when an accelerator is loosened independently of the user's intention, for example.

A period between times t32 and t33 is a steady running period when the user request power becomes constant again at PU2 (<PU1). During this period, speed recovery at motor driving power PMH32 and running with the inertial force at motor driving power PML32 are repeated.

As shown in FIGS. 6 and 7, during the inertial running control in the vehicle of the second embodiment, width R2 of the acceptable speed range during the deceleration request period is set to be narrower than width R1 of the acceptable speed range during the steady running period. Furthermore, in FIGS. 6 and 7, acceptable speed range R2 is shifted toward a higher vehicle speed as compared to FIG. 2. Such an upward shift of acceptable speed range R2 may be preferable because this leads to quick response during acceleration and gradual response during deceleration.

The process of the flow chart in FIG. 4 is performed in the second embodiment as well, with different contents of the process in S118A.

Figure 8:
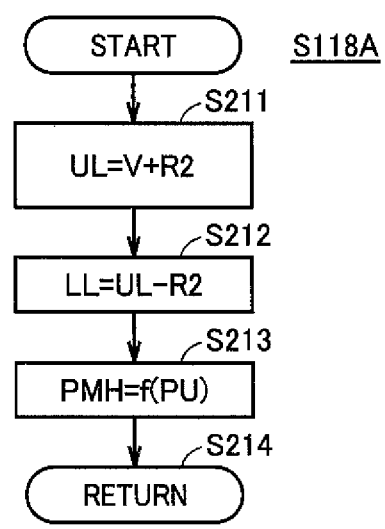
FIG. 8 is a flow chart illustrating the details of a process of setting a vehicle speed upper limit value and a vehicle speed lower limit value, which is performed in S118A in FIG. 4 in the second embodiment.

FIG. 8 is a flow chart illustrating the details of the process of setting the vehicle speed upper limit value and the vehicle speed lower limit value, which is performed in S118A in FIG. 4 in the second embodiment.

Referring to FIG. 8, first, in S211, vehicle speed upper limit value UL is set based on target vehicle speed V which was determined in S110 and width R2 of the acceptable range which was determined in S116, in accordance with the following equation (3):

$$UL = V + R2 \quad (3)$$

Then, in S212, vehicle speed lower limit value LL is set based on target vehicle speed V which was determined in S110 and width R2 of the acceptable range which was determined in S116, in accordance with the following equation (4):

$$LL = UL - R2 \quad (4)$$

It is to be noted that the equations (3) and (4) are exemplary methods of shifting vehicle speed upper limit value UL and vehicle speed lower limit value LL toward a higher vehicle speed as compared to S118, and UL and LL may be calculated in accordance with other methods. For example, an offset amount $\alpha$ may be determined such as UL=V+R2-$\alpha$ and LL=UL-R2-$\alpha$, and a shift amount may be adjusted appropriately. It is to be noted that a may be positive or negative.

Furthermore, in S213, PMH indicating a pulse height of the motor output during the high output period is determined based on user request power PU and predetermined function f (PU). Function f (PU) may be an experimentally obtained map or the like.

Then, in S214, the control is returned to the flow chart of FIG. 4, and the process of step S120 and its subsequent steps is performed.

By performing the control in accordance with the process as described above, the driving power variation operation of repeating inertial running and acceleration running can be performed not only when the user request power is substantially constant (steady running period) but also during the acceleration request period and the deceleration request period, to thereby improve the energy efficiency during the vehicle running. Furthermore, since the acceptable speed range during the acceleration request period and the deceleration request period is set to be narrower than the range during the steady running period, the drivability during acceleration and deceleration can be improved. The response during acceleration and deceleration can also be changed.

Third Embodiment

In the first embodiment, when setting the width of the acceptable speed range to be narrow during the acceleration request period or the deceleration request period, vehicle speed upper limit value UL and vehicle speed lower limit value LL are set with the average vehicle speed as a center during speed variation. In contrast, in a third embodiment, the width of the acceptable speed range is similarly set to be narrow during the acceleration request period or the deceleration request period. In so doing, control is performed such that the average speed is lower than that in the first embodiment by limiting the vehicle speed upper limit value further than the lower limit value.

Figure 9:
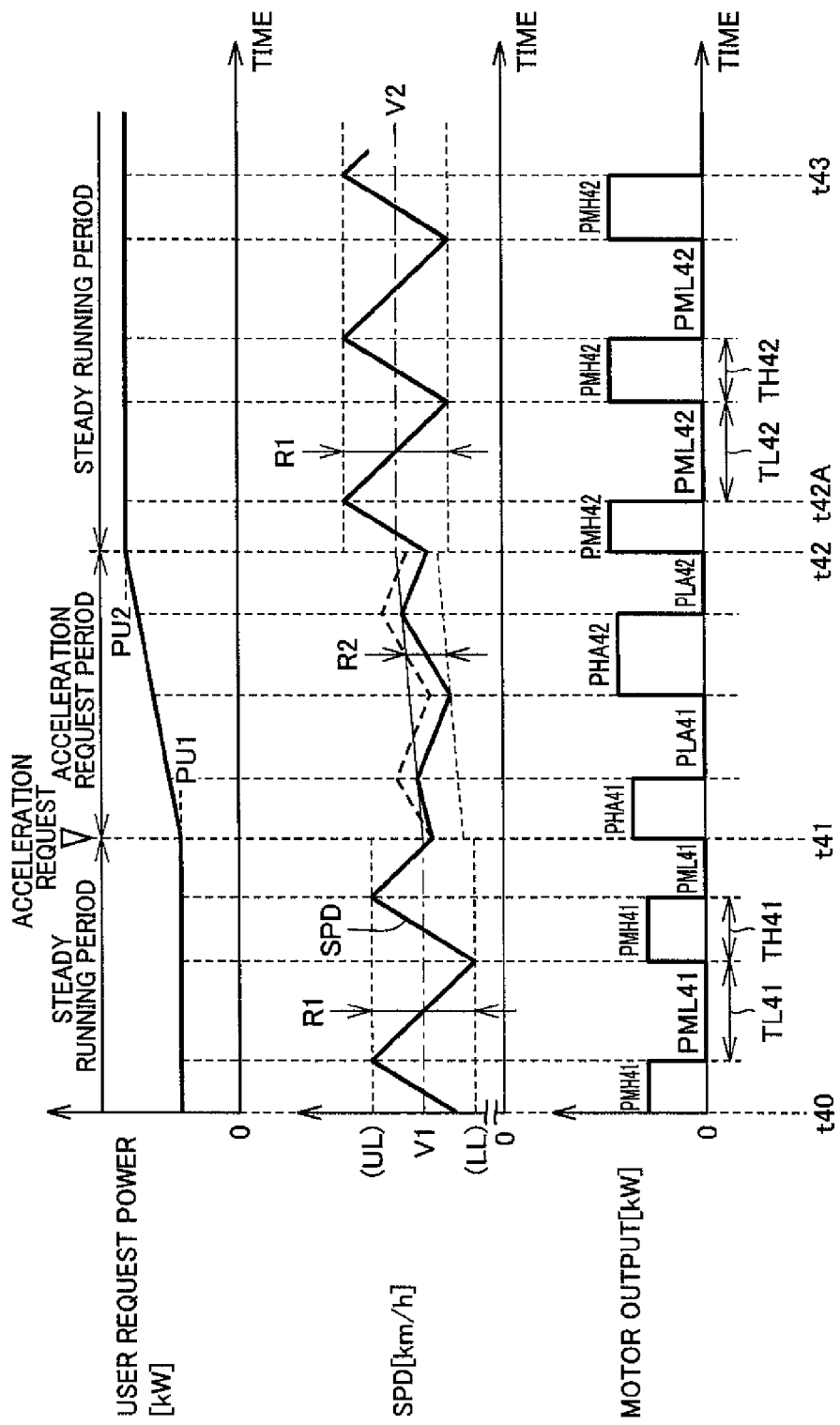
FIG. 9 is a first time chart (during acceleration) illustrating the outline of inertial running control in a third embodiment.

FIG. 9 is a first time chart (during acceleration) illustrating the outline of inertial running control in the third embodiment. In FIG. 9, a horizontal axis represents time, and a vertical axis represents power requested by the user, vehicle speed SPD, and the output of the motor generator.

During steady running periods between times t40 and t41 and between times t42 and t43 in FIG. 9, control similar to the control during the steady running periods between times t0 and t1 and between times t2 and t3 in FIG. 2 is performed, respectively, and thus the detailed description thereof will not be repeated. Periods TL41, TH41, TL42 and TH42 in FIG. 9 correspond to periods TL1, TH1, TL2 and TH2 in FIG. 2, respectively. Driving powers PMH41, PML41, PMH42 and PML42 in FIG. 9 correspond to PMH1, PML1, PMH2 and PML2 in FIG. 2, respectively.

An acceleration request is made by the user at time t41 in FIG. 9. During an acceleration request period between times t41 and t42, the user request power gradually increases from PU1 to PU2. During this time, the average speed of the vehicle increases from speed V1 to speed V2. Motor driving powers PHA41 and PHA42 gradually increase so as to increase the average speed. Motor driving powers PLA41 and PLA42 are also determined appropriately so as to increase the average speed. Motor driving powers PLA41 and PLA42 may be zero. Periods THA41 and THA42 of motor driving powers PHA41 and PHA42 and periods TLA41 and TLA42 of motor driving powers PLA41 and PLA42 are also determined appropriately so as to increase the average speed.

A width of acceptable speed range R2 between times t41 and t42 is set to be narrower than a width of acceptable speed range R1 between times t40 and t41. The drivability is thus improved, such as by eliminating non-smoothness during acceleration.

Moreover, in FIG. 9, acceptable speed range R2 is shifted toward a lower vehicle speed as compared to FIG. 2. For reference, a waveform of vehicle speed SPD between times t1 and t2 in FIG. 2 is also indicated with a broken line between times t41 and t42 in FIG. 9. Such a downward shift of acceptable speed range R2 leads to gradual response during acceleration. Therefore, although the period between t41 and t42 increases, it is preferable to shift acceptable speed range R2 downward as shown in FIG. 9 for a vehicle which seeks to increase gasoline mileage at all times. Such control may be preferable in order to avoid a low-efficiency operation range of driving sources such as a motor and an engine.

A period between times t42 and t43 is a steady running period when the user request power becomes constant again at PU2 (>PU1). During this period, speed recovery at motor driving power PMH42 and running with the inertial force at motor driving power PML42 are repeated.

Figure 10:
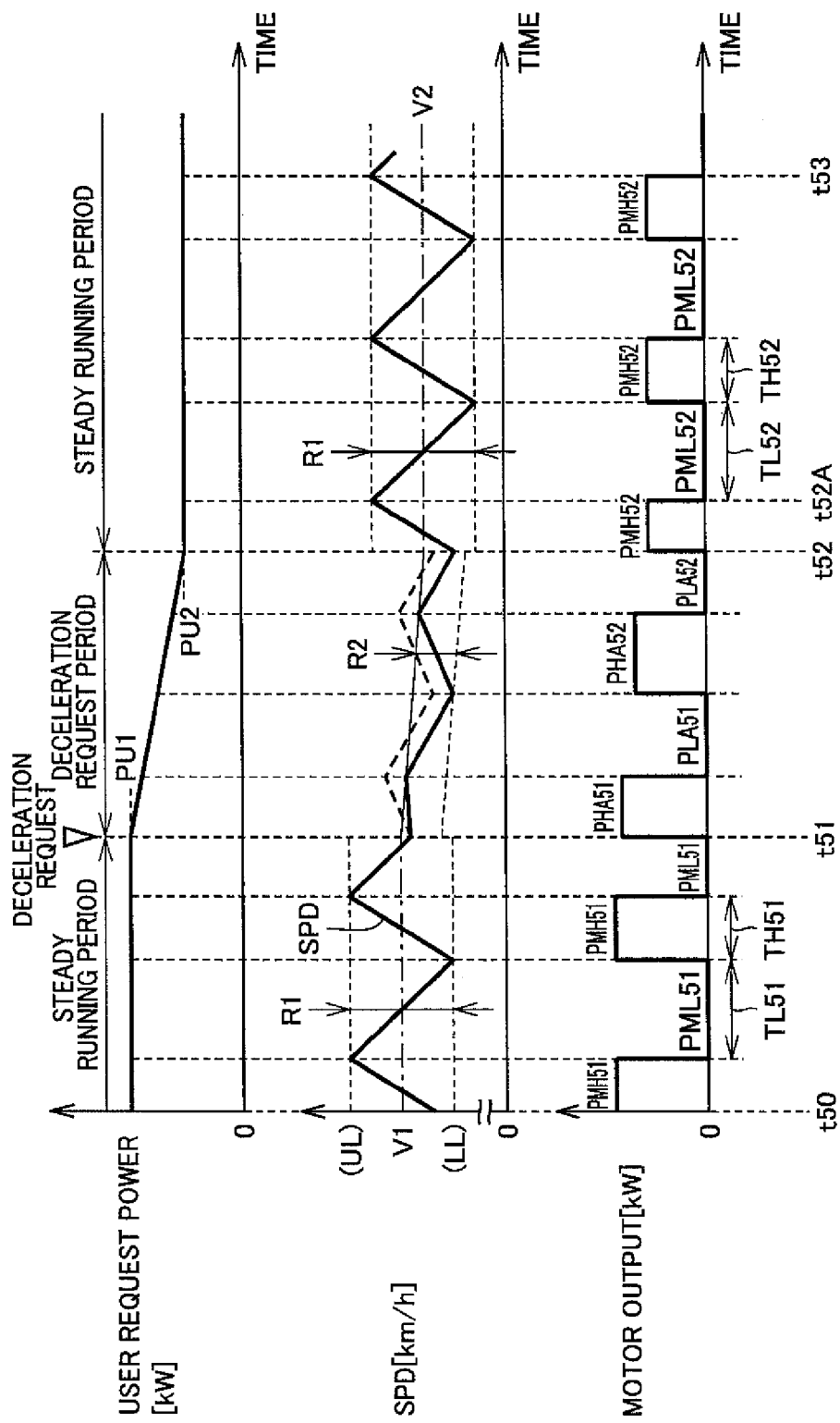
FIG. 10 is a second time chart (during deceleration) illustrating the outline of inertial running control in the third embodiment.

FIG. 10 is a second time chart (during deceleration) illustrating the outline of inertial running control in the third embodiment. In FIG. 10, a horizontal axis represents time, and a vertical axis represents power requested by the user, vehicle speed SPD, and the output of the motor generator.

During steady running periods between times t50 and t51 and between times t52 and t53 in FIG. 10, control similar to the control during the steady running periods between times t10 and t11 and between times t12 and t13 in FIG. 3 is performed, respectively, and thus the detailed description thereof will not be repeated. Periods TL51, TH51, TL52 and TH52 in FIG. 10 correspond to periods TL11, TH11, TL12 and TH12 in FIG. 3, respectively. Driving powers PMH51, PML51, PMH52 and PML52 in FIG. 10 correspond to PMH11, PML11, PMH12 and PML12 in FIG. 3, respectively.

A deceleration request is made by the user at time t51 in FIG. 10. During a deceleration request period between times t51 and t52, the user request power gradually decreases from PU1 to PU2. During this time, the average speed of the vehicle decreases from speed V1 to speed V2. Motor driving powers PHA51 and PHA52 gradually decrease so as to reduce the average speed. Motor driving powers PLA51 and PLA52 are also determined appropriately so as to reduce the average speed. Motor driving powers PLA51 and PLA52 may be zero. Periods THA51 and THA52 of motor driving powers PHA51 and PHA52 and periods TLA51 and TLA52 of motor driving powers PLA51 and PLA52 are also determined appropriately so as to reduce the average speed.

A width of acceptable speed range R2 between times t51 and t52 is set to be narrower than a width of acceptable speed range R1 between times t50 and t51. The drivability is thus improved, such as by decelerating the vehicle quickly.

Moreover, in FIG. 10, acceptable speed range R2 is shifted toward a lower vehicle speed as compared to FIG. 3. For reference, a waveform of vehicle speed SPD between times t11 and t12 in FIG. 3 is also indicated with a broken line between times t51 and t52 in FIG. 10. Such a downward shift of acceptable speed range R2 leads to quick response during deceleration. Namely, it is preferable to shift acceptable speed range R2 downward as shown in FIG. 10 for a vehicle which places importance on response and seeks to attain high deceleration performance. Such control may be preferable in order to avoid a low-efficiency operation range of driving sources such as a motor and an engine.

A period between times t52 and t53 is a steady running period when the user request power becomes constant again at PU2 (<PU1). During this period, speed recovery at motor driving power PMH52 and running with the inertial force at motor driving power PML52 are repeated.

As shown in FIGS. 9 and 10, during the inertial running control in the vehicle of the third embodiment, width R2 of the acceptable speed range during the deceleration request period is set to be narrower than width R1 of the acceptable speed range during the steady running period. Furthermore, in FIGS. 9 and 10, acceptable speed range R2 is shifted toward a lower vehicle speed as compared to FIG. 2. Such a downward shift of acceptable speed range R2 may be preferable because this leads to gradual response during acceleration and quick response during deceleration.

The process of the flow chart in FIG. 4 is performed in the third embodiment as well, with different contents of the process in S118A.

Figure 11:
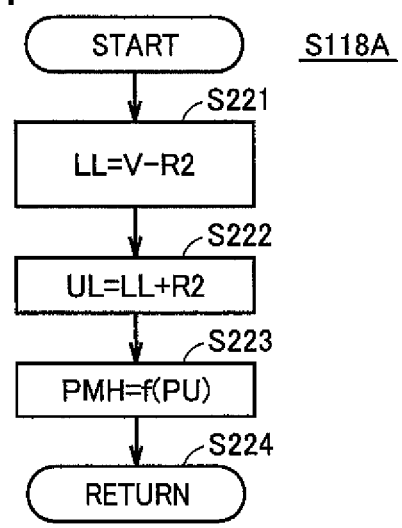
FIG. 11 is a flow chart illustrating the details of a process of setting a vehicle speed upper limit value and a vehicle speed lower limit value, which is performed in S118A in FIG. 4 in the third embodiment.

FIG. 11 is a flow chart illustrating the details of the process of setting the vehicle speed upper limit value and the vehicle speed lower limit value, which is performed in S118A in FIG. 4 in the third embodiment.

Referring to FIG. 11, first, in S221, vehicle speed lower limit value LL is set based on target vehicle speed V which was determined in S110 and width R2 of the acceptable range which was determined in S116, in accordance with the following equation (5):

$$LL = V - R2 \quad (5)$$

Then, in S222, vehicle speed upper limit value UL is set based on target vehicle speed V which was determined in S110 and width R2 of the acceptable range which was determined in S116, in accordance with the following equation (6):

$$UL = LL + R2 \quad (6)$$

It is to be noted the equations (5) and (6) are exemplary methods of shifting vehicle speed lower limit value LL and vehicle speed upper limit value UL toward a higher vehicle speed as compared to S118, and LL and UL may be calculated in accordance with other methods. For example, an offset amount α may be determined such as $LL = V - R2 + α$ and $UL = LL + R2 + α$, and a shift amount may be adjusted appropriately. It is to be noted that α may be positive or negative.

Furthermore, in S223, PMH indicating a pulse height of the motor output during the high output period is determined based on user request power PU and predetermined function f (PU). Function f (PU) may be an experimentally obtained map or the like.

Then, in S224, the control is returned to the flow chart of FIG. 4, and the process of step S120 and its subsequent steps is performed.

By performing the control in accordance with the process as described above, the driving power variation operation of repeating inertial running and acceleration running can be performed not only when the user request power is substantially constant (steady running period) but also during the acceleration request period and the deceleration request period, to thereby improve the energy efficiency during the vehicle running. Furthermore, since the acceptable speed range during the acceleration request period and the deceleration request period is set to be narrower than the range during the steady running period, the drivability during acceleration and deceleration can be improved. The response during acceleration and deceleration can also be changed.

Fourth Embodiment

In the first to third embodiments, the inertial running control in an example where a single motor generator is provided as a driving source was described. The driving sources in the first to third embodiments may be an internal combustion engine instead of the motor generator.

In a fourth embodiment, an example is described in which the inertial running control is applied to a vehicle that runs with driving power from a plurality of driving sources.

Figure 12:
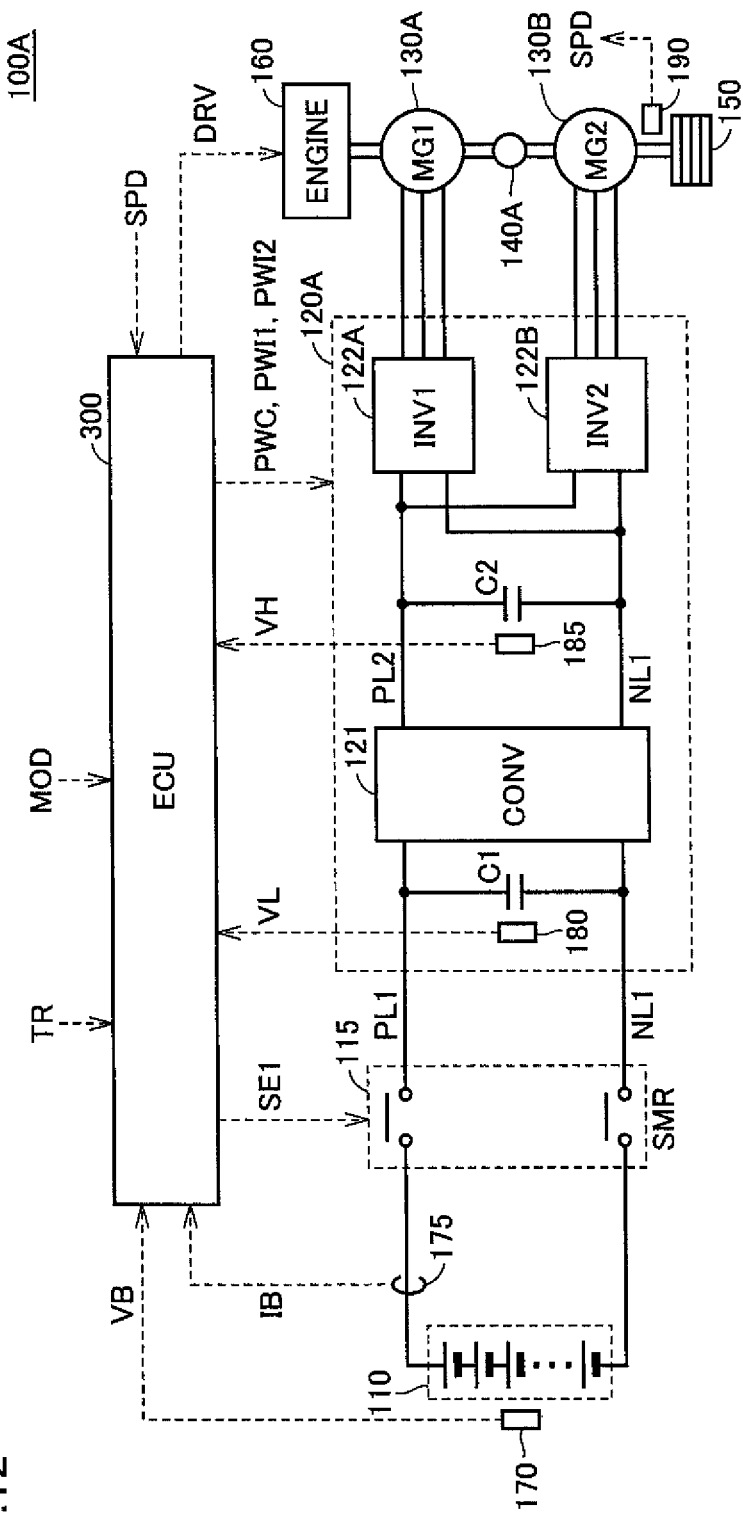
FIG. 12 is an overall block diagram of a vehicle 100A according to a fourth embodiment.

FIG. 12 is an overall block diagram of a vehicle 100A according to the fourth embodiment. Vehicle 100A is a hybrid vehicle including a rotating electric machine and an engine which is an internal combustion engine as driving sources.

In FIG. 12, PCU 120 in FIG. 1 is replaced by a PCU 120A, and motor generator 130 is replaced by motor generators 130A, 130B and an engine 160 as driving sources. The descriptions of the elements in FIG. 12 the same as those in FIG. 1 will not be repeated.

Referring to FIG. 12, PCU 120A includes converter 121, inverters 122A, 122B, capacitors C1, C2, and voltage sensors 180, 185.

Inverters 122A and 122B are connected in parallel to converter 121 through power lines PL2 and NL1.

Inverter 122A is controlled by a control signal PW11 from ECU 300, and converts DC power from converter 121 to AC power, to drive motor generator 130A (hereinafter also referred to as an "MG1"). Inverter 122A also converts AC power generated by motor generator 130A to DC power, to charge power storage device 110 through converter 121.

Inverter 122B is controlled by a control signal PW12 from ECU 300, and converts DC power from converter 121 to AC power, to drive motor generator 130B (hereinafter also referred to as an "MG2"). Inverter 122B also converts AC power generated by motor generator 130B to DC power, to charge power storage device 110 through converter 121.

Motor generators 130A and 130B have output shafts coupled to a power transmission gear 140A including a power split device such as a planetary gear. Driving power from motor generators 130A and 130B is transmitted to drive wheel 150.

Motor generators 130A and 130B are coupled to engine 160 through power transmission gear 140A. Engine 160 is controlled by a control signal DRV from ECU 300. Driving power generated by engine 160 is transmitted to drive wheel 150 and motor generator 130A through power transmission gear 140A. ECU 300 cooperatively controls driving power generated by motor generators 130A, 130B and engine 160, to run the vehicle.

In the fourth embodiment, motor generator 130A is used exclusively as a starter motor when starting engine 160 and as a generator for generating electric power by being driven by engine 160. Motor generator 130B is used exclusively as a motor for driving drive wheel 150 by using the electric power from power storage device 110.

Although FIG. 12 shows an exemplary configuration where two motor generators and one engine are provided, the number of motor generators is not limited as such. For example, one motor generator may be provided. Alternatively, more than two motor generators may be provided.

Figure 13:
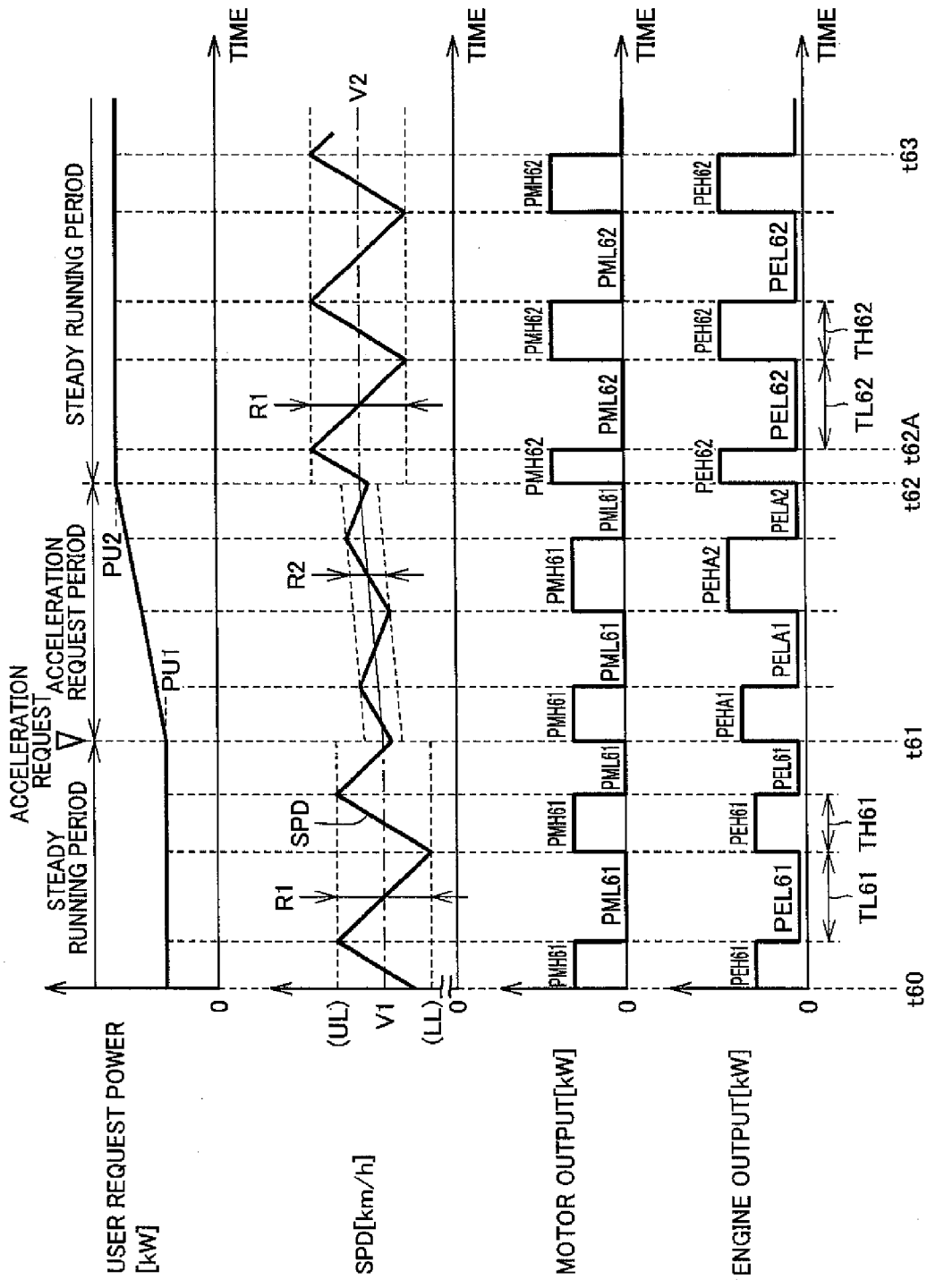
FIG. 13 is a first time chart (during acceleration) illustrating the outline of inertial running control in the fourth embodiment.

FIG. 13 is a first time chart (during acceleration) illustrating the outline of inertial running control in the fourth embodiment. In FIG. 13, a horizontal axis represents time, and a vertical axis represents power requested by the user, vehicle speed SPD, and the output of the motor generator.

Referring to FIGS. 12 and 13, it is assumed, for example, that vehicle 100 runs on a flat road at constant vehicle speed V1. In this case, power requested by the user is given as substantially constant value PU1, as shown in FIG. 13. That "power requested by the user is a substantially constant value" refers to a state in which the user request power is maintained, although it varies to a degree, within a predetermined range (e.g., ±3 km/h) during a prescribed period of time.

When the inertial running control in the third embodiment is applied, acceleration running in which the driving powers from motor generator 130B and engine 160 are in a high output state and inertial running in which the driving powers from motor generator 130B and engine 160 are in a low output state are alternately repeated.

Specifically, during a steady running period between times t60 and t61, a first state in which motor driving power PMH61 and an engine output PEH61 are output for a period TH61 and a second state in which motor driving power PML61 and an engine output PEL61 continue to be output for a period TL61 are alternately repeated.

In the second state in which motor driving power PML61 and engine output PEL61 continue to be output for period TL61 during the inertial running control, a sum of the driving powers is smaller than driving power capable of maintaining current vehicle speed VI, and therefore running with the inertial force is started and vehicle speed SPD gradually decreases, as indicated by a solid line in FIG. 13.

Then, when vehicle speed SPD decreases to lower limit value LL of predetermined acceptable range R1 with respect to target vehicle speed V1, motor generator 130B and engine 160 are switched to a high output state. A sum of the motor output and the engine output at this time is set to PMH61+PEH61 which is larger than the output required to maintain vehicle speed V1. Vehicle 100 is thus accelerated.

Then, when vehicle speed SPD increases to upper limit value UL of predetermined acceptable range R1, motor generator 130B and engine 160 are switched to a low output state (PML61+PEL61) again and inertial running is performed. Although the engine preferably performs a no-load operation equivalent to idling in the low output state, the output may be zero (PML61=0, PEL61=0) in the low output state.

By repeating such driving power variation operation, a decrease in SOC of the power storage device and the fuel can be suppressed while an average speed of vehicle speed SPD is maintained substantially at V1, although vehicle speed SPD varies within acceptable range R1. As a result, the energy efficiency can be improved as a whole, thereby increasing the distance that can be traveled.

It is to be noted that the motor output, engine output and acceleration time when the motor generator performs acceleration running can be set appropriately. For example, the acceleration time may be set to a prescribed period of time, and the motor output may be set such that vehicle speed SPD can be increased from lower limit value LL to upper limit value UL during that period. Alternatively, the motor output and engine output used for acceleration may be set to a prescribed output, and the acceleration time may be set depending on the situation. If the acceleration time is too short, large power is needed, which may cause torque shock. If the sum of the driving powers is too small, on the other hand, the acceleration time, namely, driving time of the motor generator and the engine is increased, making it difficult to perform inertial running. Therefore, the acceleration time and the sum of the outputs of the motor and the engine are set appropriately in consideration of drivability and energy efficiency.

Then, an acceleration request is made by the user at time t61. During an acceleration request period between times t61 and t62, the user request power gradually increases from PUT to PU2. During this time, the average speed of the vehicle increases from speed V1 to speed V2. Engine outputs PEHA1 and PEHA2 gradually increase so as to increase the average speed. Engine outputs PELA1 and PELA2 are also determined appropriately so as to increase the average speed. Engine outputs PELA1 and PELA2 may be zero. A high driving power period and a low driving power period are also determined appropriately so as to increase the average speed.

During a high output period of the motor output in the acceleration request period between times t61 and t62, driving power PMH61 the same as the driving power between times t60 and t61 is maintained. That is, during the acceleration request period between times t61 and t62, the vehicle is accelerated by increasing the engine output. A pulse height of the motor output during this time remains unchanged from the pulse height between times t60 and t61. Such control is preferable if the total energy efficiency of the vehicle is higher when the engine output is increased, such as during high-load running.

A width of acceptable speed range R2 between times t61 and t62 is set to be narrower than a width of acceptable speed range R1 between times t60 and t61. The drivability is thus improved, such as by eliminating non-smoothness during acceleration.

A period between times t62 and t63 is a steady running period when the user request power becomes constant again at PU2 (>PU1). During this period, speed recovery at motor driving power PMH62 and an engine output PEH62 and running with the inertial force at an engine output PEL62 are repeated.

At time t62 in FIG. 13, vehicle speed SPD is lower than speed V2 which is determined based on the user request power. Thus, motor power PMH62 and engine output PEH62 are output immediately, and a transition to inertial running is made at time t62A when vehicle seed SPD reaches upper limit vehicle speed UL.

As shown in FIG. 13, in the vehicle of the fourth embodiment, during the inertial running control, width R2 of the acceptable speed range for the acceleration request period is set to be narrower than width R1 of the acceptable speed range for the steady running period. Widths R1 and R2 are set with the average speed as a center.

With such control, the energy efficiency during the vehicle running is improved during the steady running period, and deterioration in drivability during acceleration is suppressed while the energy efficiency is improved during the acceleration request period.

Figure 14:
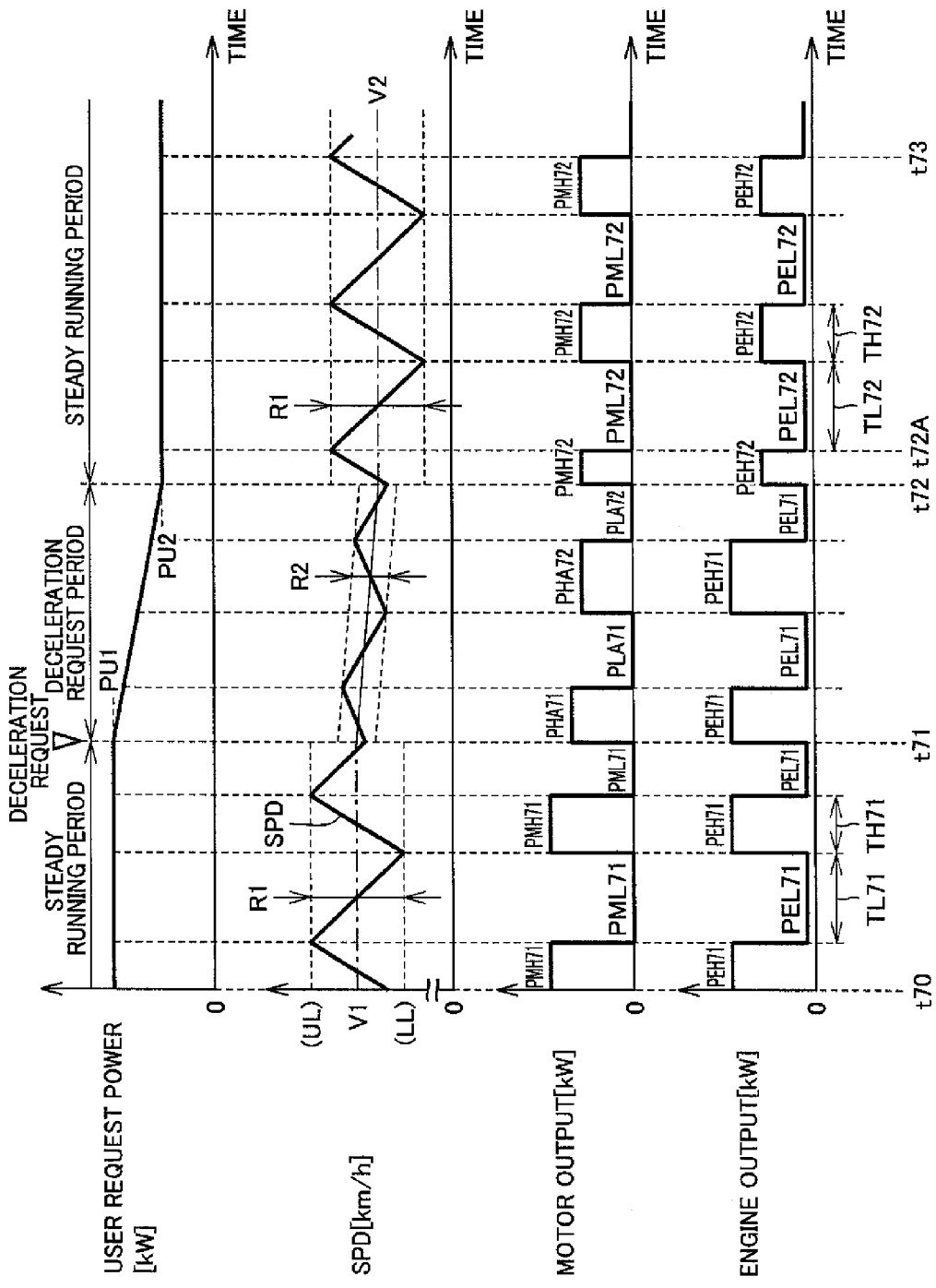
FIG. 14 is a second time chart (during deceleration) illustrating the outline of inertial running control in the fourth embodiment.

FIG. 14 is a second time chart (during deceleration) illustrating the outline of inertial running control in the fourth embodiment. In FIG. 14, a horizontal axis represents time, and a vertical axis represents power requested by the user, vehicle speed SPD, and the output of the motor generator.

Referring to FIGS. 12 and 14, between times t70 and t71, the inertial running control is applied, so that acceleration running in which the driving powers from motor generator 130 and engine 160 are in a high output state and inertial running in which the driving powers from motor generator 130 and engine 160 are in a low output state are alternately repeated.

Specifically, during a steady running period between times t70 and t71, a first state in which motor driving power PMH71 and an engine output PEH71 are output for a period TH71 and a second state in which motor driving power PML71 and an engine output PEL71 are output for a period TL71 are alternately repeated.

In the second state (period TL71) during the inertial running control, a sum of the motor driving power and the engine driving power is smaller than driving power capable of maintaining current vehicle speed V1, and therefore running with the inertial force is started and vehicle speed SPD gradually decreases, as indicated by a solid line in FIG. 14.

Then, when vehicle speed SPD decreases to lower limit value LL of predetermined acceptable range R1 with respect to target vehicle speed V1, motor generator 130 and engine 160 are switched to a high output state. A sum of the motor output and the engine output at this time is set to be larger than the output required to maintain vehicle speed V1, Vehicle 100 is thus accelerated.

Then, when vehicle speed SPD increases to upper limit value UL of predetermined acceptable range R1, motor generator 130 and engine 160 are switched to a low output state (driving power PML71+PEL71) again and inertial running is performed. Although the engine preferably performs a no-load operation equivalent to idling in the low output state, the output may be zero (PML71=0, PEL71=0) in the low output state.

By repeating such driving power variation operation, the energy efficiency can be improved as a whole while an average speed of vehicle speed SPD is maintained substantially at V1, although vehicle speed SPD varies within acceptable range R1, thereby increasing the distance that can be traveled.

The acceleration time and the motor and engine outputs during acceleration are set appropriately in consideration of drivability and energy efficiency, as in the period between times t61 and t62 in FIG. 13.

Then, a deceleration request is made by the user at time t71. During a deceleration request period between times t71 and t72, the user request power gradually decreases from PU1 to PU2. During this time, the average speed of the vehicle decreases from speed V1 to speed V2. Motor driving powers PHA71 and PHA72 gradually decrease so as to reduce the average speed. Motor driving powers PLA71 and PLA72 are also determined appropriately so as to reduce the average speed. Motor driving powers PLA71 and PLA72 may be zero.

During a high output period of the engine output in the deceleration request period between times t71 and t72, driving power PEH71 the same as the driving power between times t70 and t71 is maintained. That is, during the deceleration request period between times t71 and t72, the vehicle is decelerated by reducing the motor output. A pulse height of the engine output during this time remains unchanged from the pulse height between times t70 and t71. Such variation of the motor output is preferable when increasing the response of the vehicle, for example.

A width of acceptable speed range R2 between times t71 and t72 is set to be narrower than a width of acceptable speed range R1 between times t70 and t71. The drivability is thus improved, such as by decelerating the vehicle quickly.

A period between times t72 and t73 is a steady running period when the user request power becomes constant again at PU2 (<PU1). During this period, speed recovery at motor driving power PMH72 and an engine output PEH72 and running with the inertial force at motor driving power PML72 and an engine output PEL72 are repeated.

At time t72 in FIG. 14, vehicle speed SPD is lower than speed V2 which is determined based on the user request power, and therefore motor power PMH72 and engine output PEH72 are output immediately, and a transition to inertial running is made at time t72A when vehicle seed SPD reaches upper limit vehicle speed UL.

As shown in FIG. 14, in the vehicle of the fourth embodiment, during the inertial running control, width R2 of the acceptable speed range for the deceleration request period is set to be narrower than width R1 of the acceptable speed range for the steady running period. Widths R1 and R2 are set with the average speed as a center.

With such control, the energy efficiency during the vehicle running is improved during the steady running period, and deterioration in drivability during deceleration is suppressed while the energy efficiency is improved during the deceleration request period.

Figure 15:
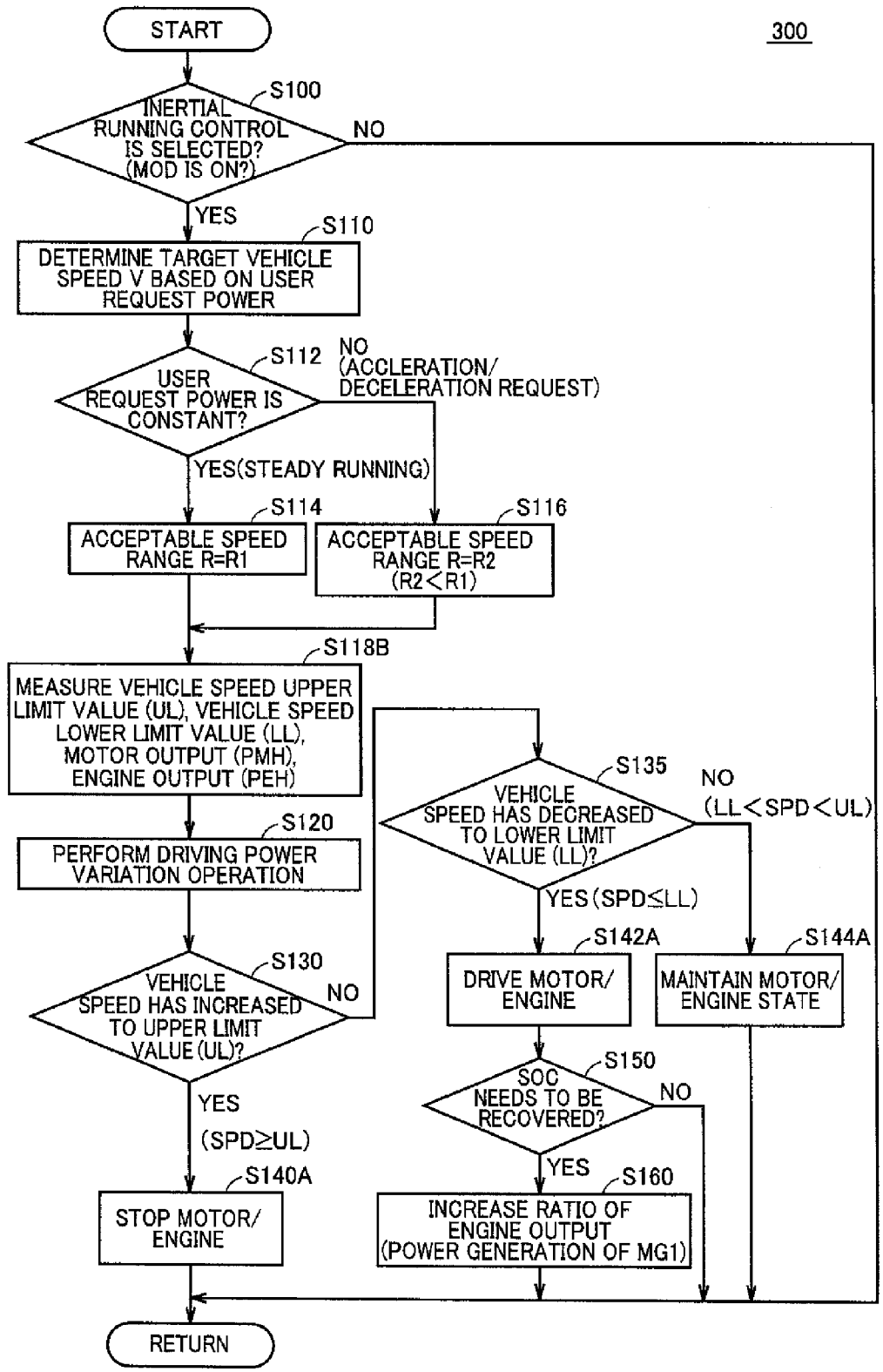
FIG. 15 is a flow chart illustrating a process of the inertial running control performed by ECU 300 in the fourth embodiment.

FIG. 15 is a flow chart illustrating a process of the inertial running control performed by ECU 300 in the fourth embodiment.

In FIG. 15, the process from S100 to S116 is similar to the process described with reference to FIG. 4, and thus the description thereof will not be repeated.

When acceptable speed range R is determined as R1 or R2 in the process of S114 or S116, the process proceeds to S118B where vehicle speed upper limit value UL, vehicle speed lower limit value LL, motor output PMH and engine output PEH are determined.

Figure 16:
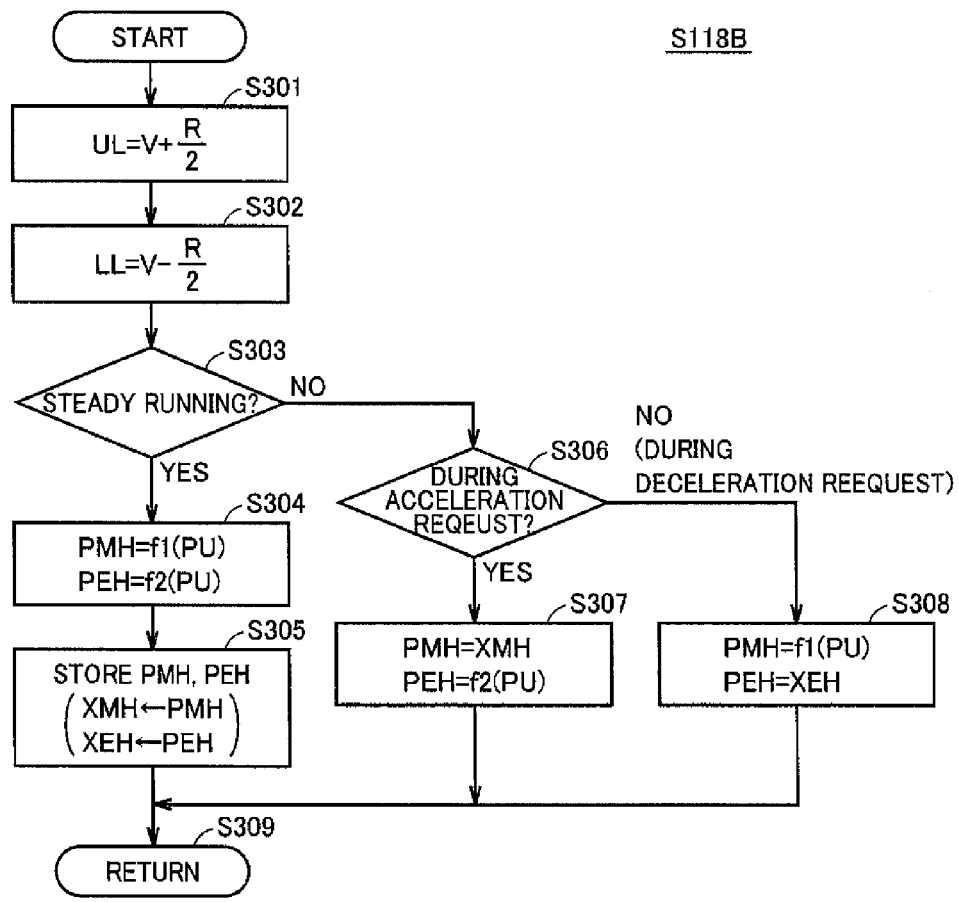
FIG. 16 is a flow chart illustrating the details of a process of S118B in FIG. 15.

FIG. 16 is a flow chart illustrating the details of the process of S118B in FIG. 15.

Referring to FIG. 16, first, in S301, vehicle speed upper limit value UL is set based on target vehicle speed V which was determined in S110 and width R of the acceptable range which was determined in S114 or S116, in accordance with the following equation (7):

$$UL = V + R/2 \tag{7}$$

Then, in S302, vehicle speed lower limit value LL is set based on target vehicle speed V which was determined in S110 and width R of the acceptable range which was determined in S114 or S116, in accordance with the following equation (8):

$$LL = V - R/2 \tag{8}$$

Furthermore, in S303, it is determined whether or not steady running is being performed based on a variation in the user request power. This determination is made on the same basis as that in S112. The process proceeds to S304 if it is determined in S303 that steady running is being performed, and proceeds to S306 if it is determined that steady running is not being performed.

In S304, PMH indicating a pulse height of the motor output during the high output period is determined based on user request power PU and a predetermined function f1 (PU). In S304, moreover, PEH indicating a pulse height of the engine output during the high output period is determined based on user request power PU and a predetermined function f2 (PU).

Then, in S305, PMH and PEH thus determined are stored as XMH and XEH, respectively. The process then proceeds to S309, and the process of S120 and its subsequent steps in FIG. 15 is performed.

If the process proceeds from S303 to S306, on the other hand, it is determined in S306 whether or not an acceleration request is being made based on a variation in the user request power. The process proceeds to S307 if it is determined in S306 that an acceleration request is being made, and proceeds to S308 if it is determined that an acceleration request is not being made (during a deceleration request).

In S307, stored XMH is set to PMH indicating a pulse height of the motor output during the high output period, while PEH indicating a pulse height of the engine output during the high output period is determined based on user request power PU and predetermined function f2 (PU). During an acceleration request, therefore, PMH is not updated, and only PEH is updated and increased.

In S308, stored XEH is set to PEH indicating a pulse height of the engine output during the high output period, while PMH indicating a pulse height of the motor output during the high output period is determined based on user request power PU and predetermined function f1 (PU). During a deceleration request, therefore, PEH is not updated, and only PMH is updated and increased.

If importance is placed on response during an acceleration request, S307 and S308 may be exchanged with each other and applied.

When PMH and PEH are determined in S307 or S308, the process proceeds to S309, and the process of S120 and its subsequent steps in FIG. 15 is performed.

Referring again to FIG. 15, if the driving power variation operation is performed (S120), and when vehicle speed SPD increases to upper limit value UL (YES in S130), ECU 300 switches MG2 to a low output state to perform inertial running (S140A), Then, when vehicle speed SPD decreases to lower limit value LL (YES in S135), ECU 300 switches MG2 to a high output state to perform acceleration running (S142A).

In S140A and S142A, engine 160 is basically idling, but may be stopped. When vehicle speed SPD is decreasing within the acceptable speed range (LL<SPD<UL) in S135, namely, if vehicle speed SPD has not decreased to lower limit value LL of the acceptable speed range (NO in S135), the process proceeds to S144A where ECU 300 maintains current states of motor generator 130 and engine 160, to continue the inertial running. The process then returns to the main routine, and the process is performed again from S100 in the next control cycle.

If acceleration running is selected in S142A, in S150, ECU 300 determines whether or not the SOC has fallen below a prescribed threshold value and needs to be recovered by charging of power storage device 110.

If the SOC needs to be recovered (YES in S150), the process proceeds to S160 where ECU 300 drives engine 160, and charges power storage device 110 with the electric power generated by MG1. ECU 300 also reduces the driving power of MG2.

If the SOC does not need to be recovered (NO in S150), on the other hand, the process of S160 is skipped, and ECU 300 stops engine 160 and switches MG2 to a high output state, to perform acceleration running.

The process is then returned to the main routine, and performed again from S100 in the next control cycle.

By performing the control in accordance with the process as described above, the driving power variation operation is performed in the hybrid vehicle including the engine and the motor generator, to thereby improve the energy efficiency during the vehicle running.

In FIGS. 13 and 14, acceptable speed range R is brought closer to the center when it is set to be narrower during the acceleration or deceleration request period than during the steady running period. Alternatively, the acceptable speed range during the acceleration or deceleration request period may be shifted toward a higher vehicle speed as in the second embodiment, or may be shifted toward a lower vehicle speed as in the third embodiment.

Fifth Embodiment

In the fourth embodiment above, the hybrid vehicle including the engine and the motor generator as a plurality of driving sources was described by way of example. The present invention is also applicable to vehicles having other configurations, such as an electric vehicle having a twin motor configuration capable of running with driving power from two motor generators as a plurality of driving sources, for example.

Figure 17:
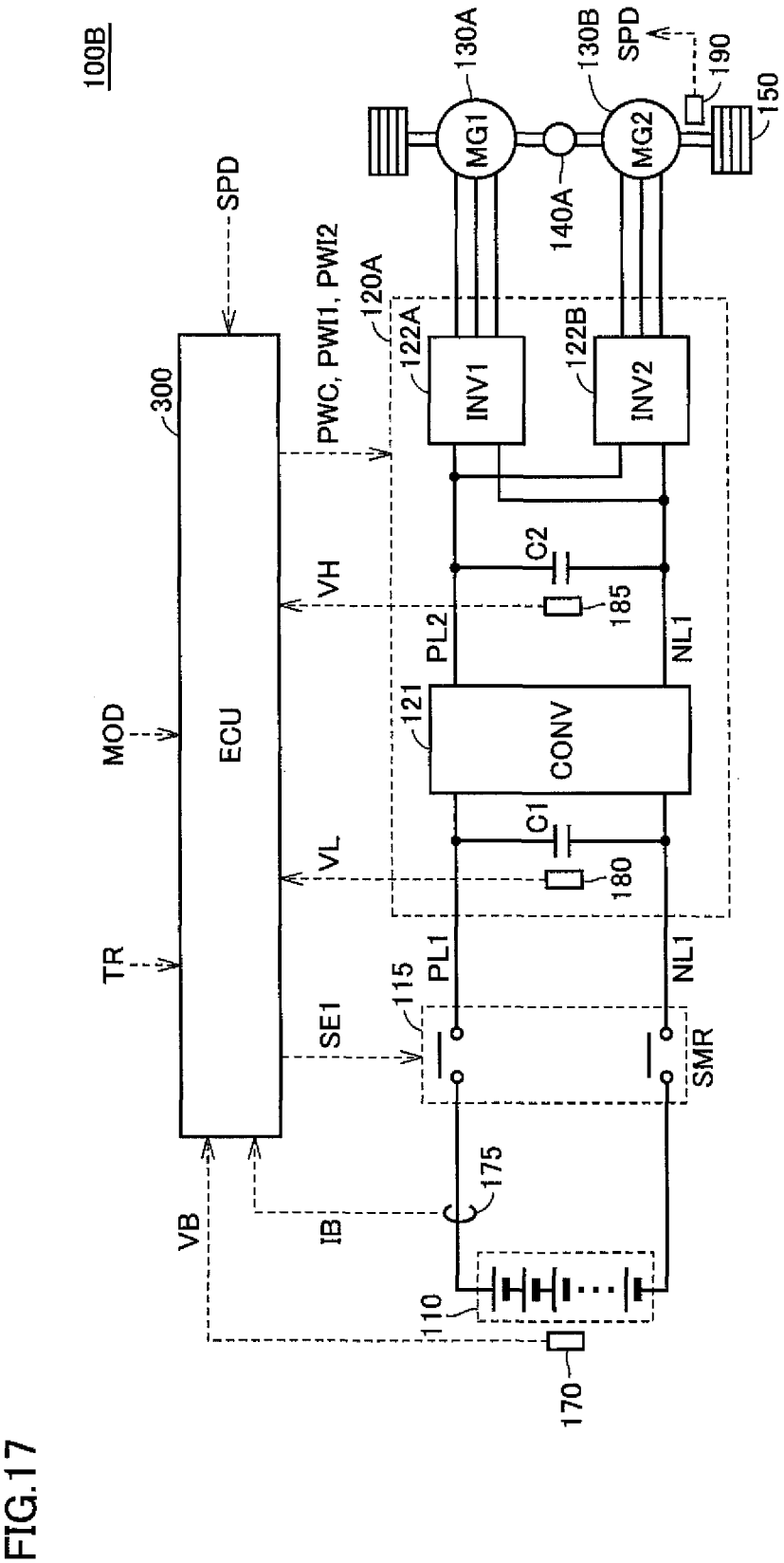
FIG. 17 illustrates a schematic configuration of a vehicle 100B according to a fifth embodiment.

FIG. 17 illustrates a schematic configuration of a vehicle 100B according to a fifth embodiment.

Vehicle 100B in FIG. 17 has the configuration of vehicle 100A in FIG. 12 which is not provided with engine 160. Vehicle 100B runs with driving power from both motor generator 130A (MG1) and motor generator 130B (MG2).

In this case, although power storage device 100 cannot be charged as in the fourth embodiment, the driving power variation operation can be performed by replacing the driving power of engine 160 with an output of MG1 in FIGS. 13 and 14 in the fourth embodiment, The present invention is also applicable to an example where MG1 is used as a motor rather than as a generator and the vehicle runs with driving power generated by three driving sources of MG1, MG2 and engine 160, in the configuration of FIG. 12.

Lastly, the first to fifth embodiments described above will be summarized again with reference to the drawings.

Referring to FIGS. 1, 12 and 17, a vehicle (100, 100A, 100B) includes a driving source (MG130, MG130A, MG130B, engine 160) generating driving power for running the vehicle, and a control device (ECU 300) for controlling the driving source. The control device (ECU 300) performs driving power variation operation on the driving source (MG130, MG130A, MG130B, engine 160) in which the driving source is switched between a first state where the driving source generates driving power and a second state where the driving source generates driving power of a level lower than the level of the driving power in the first state to run the vehicle. The control device (ECU 300) performs the driving power variation operation during steady running when variation in driving power requested by a user falls within a prescribed range, and also performs the driving power variation operation during an acceleration request shown in FIGS. 2, 6, 9 and 13 or during a deceleration request shown in FIGS. 3, 7, 10 and 14 when the variation in the requested driving power increases or decreases beyond the prescribed range.

Preferably, the control device (ECU 300) switches the driving source to the first state in response to a decrease in a speed of the vehicle to a lower limit value of an acceptable range (YES in S135 in FIGS. 4 and 15), and switches the driving source to the second state in response to an increase in the speed of the vehicle to an upper limit value of the acceptable range (YES in S130 in FIGS. 4 and 15). As shown in FIGS. 2, 6, 9 and 13, the control device (ECU 300) sets a width of the acceptable range to be narrower during the acceleration request (width R2) than during the steady running (width R1).

Preferably, as shown in FIGS. 6 and 8, the control device (ECU 300) sets the upper limit value of the acceptable range based on the driving power requested by the user, and brings the lower limit value of the acceptable range closer to the upper limit value during the acceleration request than during the steady running.

More preferably, as shown in FIGS. 9 and 11, the control device (ECU 300) sets the lower limit value of the acceptable range based on the driving power requested by the user, and brings the upper limit value of the acceptable range closer to the lower limit value during the acceleration request than during the steady running.

Preferably, the control device (ECU 300) causes switching to the first state in response to a decrease in the speed of the vehicle (100) to a lower limit value of an acceptable range (YES in S135 in FIGS. 4 and 15), and causes switching to the second state in response to an increase in the speed of the vehicle (100) to an upper limit value of the acceptable range (YES in S130 in FIGS. 4 and 15). As shown in FIGS. 3, 7, 10 and 14, the control device (300) sets a width of the acceptable range to be narrower during the deceleration request than during the steady running.

More preferably, as shown in FIGS. 7 and 8, the control device (300) sets the upper limit value of the acceptable range based on the driving power requested by the user, and brings the lower limit value of the acceptable range closer to the upper limit value during the deceleration request than during the steady running.

More preferably, as shown in FIGS. 10 and 11, the control device (ECU 300) sets the lower limit value of the acceptable range based on the driving power requested by the user, and brings the upper limit value of the acceptable range closer to the lower limit value during the deceleration request than during the steady running.

Preferably, as shown in FIG. 12, the driving source includes a rotating electric machine (MG 130B) and an internal combustion engine (engine 160). The control device (ECU 300) switches both of the rotating electric machine and the internal combustion engine between the first state and the second state to run the vehicle in the driving power variation operation. As shown in FIG. 13, during the acceleration request, the control device (ECU 300) accelerates the vehicle by raising the level of the driving power of the internal combustion engine in the first state while maintaining the level of the driving power of the rotating electric machine in the first state constant.

Preferably, as shown in FIG. 12, the driving source includes a rotating electric machine (MG 130B) and an internal combustion engine (engine 160). The control device (ECU 300) switches both of the rotating electric machine and the internal combustion engine between the first state and the second state to run the vehicle in the driving power variation operation. As shown in FIG. 14, during the deceleration request, the control device (ECU 300) accelerates the vehicle by lowering the level of the driving power of the rotating electric machine in the first state while maintaining the level of the driving power of the internal combustion engine in the first state constant.

It should be understood that the embodiments disclosed herein are illustrative and non-restrictive in every respect. The scope of the present invention is defined by the terms of the claims, rather than the description above, and is intended to include any modifications within the scope and meaning equivalent to the terms of the claims.

REFERENCE SIGNS LIST 100, 100A, 100E vehicle; 110 power storage device; 121 converter; 122, 122A, 122B inverter; 130, 130A, 130B motor generator; 140, 140A power transmission gear; 150 drive wheel; 160 engine; 170, 180, 185 voltage sensor; 175 current sensor; 190 speed sensor; C1, C2 capacitor; PL1, NL1, PL2 power line.

The invention claimed is:

1. A vehicle comprising:
a driving source generating driving power for running the vehicle; and
a control device for controlling the driving source,
the control device performing driving power variation operation on the driving source in which the driving source is switched between a first state where the driving source generates driving power and a second state where the driving source generates driving power of a level lower than the level of the driving power in the first state to run the vehicle, the control device performing the driving power variation operation during steady running when variation in driving power requested by a user falls within a prescribed range, and also performing the driving power variation operation during an acceleration request or during a deceleration request when the variation in the requested driving power increases or decreases beyond the prescribed range, the steady running having a first range of vehicle speed, and the deceleration and acceleration requests each having a second range of vehicle speed, the control device switching the driving source to the first state in response to a decrease in a speed of the vehicle to a lower limit value of the second range, and switching the driving source to the second state in response to an increase in the speed of the vehicle to an upper limit value of the second range, the control device setting a width of the second range to be narrower during at least one of the acceleration request and the deceleration request than the first range of the steady running.

2. The vehicle according to claim 1, wherein
the control device sets the upper limit value of the acceptable range based on the driving power requested by the user, and brings the lower limit value of the acceptable range closer to the upper limit value during the acceleration request than during the steady running.

3. The vehicle according to claim 1, wherein
the control device sets the lower limit value of the acceptable range based on the driving power requested by the user, and brings the upper limit value of the acceptable range closer to the lower limit value during the acceleration request than during the steady running.

4. The vehicle according to claim 1, wherein
the control device sets the upper limit value of the acceptable range based on the driving power requested by the user, and brings the lower limit value of the acceptable range closer to the upper limit value during the deceleration request than during the steady running.

5. The vehicle according to claim 1, wherein
the control device sets the lower limit value of the acceptable range based on the driving power requested by the user, and brings the upper limit value of the acceptable range closer to the lower limit value during the deceleration request than during the steady running.

6. The vehicle according to claim 1, wherein
the driving source includes a rotating electric machine and an internal combustion engine,
the control device switches both of the rotating electric machine and the internal combustion engine between the first state and the second state to run the vehicle in the driving power variation operation, and
during the acceleration request, the control device accelerates the vehicle by raising the level of the driving power of the internal combustion engine in the first state while maintaining the level of the driving power of the rotating electric machine in the first state constant.

7. The vehicle according to claim 1, wherein
the driving source includes a rotating electric machine and an internal combustion engine,
the control device switches both of the rotating electric machine and the internal combustion engine between the first state and the second state to run the vehicle in the driving power variation operation, and
during the deceleration request, the control device decelerates the vehicle by lowering the level of the driving power of the rotating electric machine in the first state while maintaining the level of the driving power of the internal combustion engine in the first state constant.

8. A method of controlling a vehicle, the vehicle including a driving source generating driving power for running the vehicle, and a control device for controlling the driving source, comprising the steps of:

performing driving power variation operation on the driving source in which the driving source is switched between a first state where the driving source generates driving power and a second state where the driving source generates driving power of a level lower than the level of the driving power in the first state to run the vehicle during steady running when variation in driving power requested by a user falls within a prescribed range; and performing the driving power variation operation during an acceleration request or during a deceleration request when the variation in the requested driving power increases or decreases beyond the prescribed range, wherein the steady running has a first range of vehicle speed, and the deceleration and acceleration requests each have a second range of vehicle speed, both in the steps of performing the driving power variation operation during the stationary running and performing the driving power variation operation during the acceleration request or during the deceleration request, the driving source is switched to the first state in response to a decrease in a speed of the vehicle to a lower limit value of the second range, and is switched to the second state in response to an increase in the speed of the vehicle to an upper limit value of the second range, and in the step of performing the driving power variation operation during the acceleration request or during the deceleration request, a width of the second range is set to be narrower during at least one of the acceleration request and the deceleration request than the first range of the steady running.

\* \* \* \* \*